United States Patent
Zoller et al.

(10) Patent No.: US 12,177,954 B2
(45) Date of Patent: Dec. 24, 2024

(54) INDUCTION HEATING DEVICE, SHRINK-CLAMPING AND/OR UNSHRINK-UNCLAMPING STATION AND METHOD

(71) Applicant: E. Zoller GmbH & Co. KG Einstell-und Messgeraete, Pleidelsheim (DE)

(72) Inventors: Alexander Zoller, Pleidelsheim (DE); Christian Pfau, Ingersheim (DE)

(73) Assignee: E. Zoller GmbH & Co. KG Einstell-und Messgeraete, Pleidelsheim (DE)

( * ) Notice: Subject to any disclaimer, the term of this patent is extended or adjusted under 35 U.S.C. 154(b) by 650 days.

(21) Appl. No.: 17/125,230

(22) Filed: Dec. 17, 2020

(65) Prior Publication Data
US 2021/0195703 A1 Jun. 24, 2021

(30) Foreign Application Priority Data
Dec. 20, 2019 (DE) .................... 10 2019 135 618.0
Nov. 11, 2020 (DE) .................... 10 2020 129 700.9

(51) Int. Cl.
*H05B 6/10* (2006.01)
*B23B 31/117* (2006.01)
(Continued)

(52) U.S. Cl.
CPC ............ *H05B 6/38* (2013.01); *B23B 31/1179* (2013.01); *H05B 6/14* (2013.01)

(58) Field of Classification Search
CPC ............ H05B 6/14; H05B 6/38; B23P 11/027
See application file for complete search history.

(56) References Cited

U.S. PATENT DOCUMENTS

| | | | | |
|---|---|---|---|---|
| 933,071 | A | * | 9/1909 | Helman .................. B23B 31/19 279/112 |
| 2,742,297 | A | * | 4/1956 | Bilz .................... B23B 31/1612 279/66 |

(Continued)

FOREIGN PATENT DOCUMENTS

DE  10 2005 005 892 A1  8/2006
DE  10 2011 082 613 A1  3/2013
(Continued)

OTHER PUBLICATIONS

Search Report dated Nov. 12, 2020 issued in corresponding DE patent application No. 10 2019 135 618.0 (and English translation).
(Continued)

*Primary Examiner* — Dana Ross
*Assistant Examiner* — Lawrence H Samuels
(74) *Attorney, Agent, or Firm* — Posz Law Group, PLC

(57) ABSTRACT

An induction heating device for a shrink-clamping and/or unshrink-unclamping of tools into and/or out of a tool holder, includes: an induction heating unit comprising one induction coil configured, in a shrink-clamping and/or unshrink-unclamping process, to heat-expand a portion of a tool holder arranged in a receiving region of the induction heating unit; a magnetic flux conducting unit comprising one magnetic flux conducting element for conduction of magnetic flux generated by the induction coil; and a bearing unit configured for a movable support of the magnetic flux conducting element, wherein a large portion of all points of the magnetic flux conducting element each have a respective movement path predetermined partially by the bearing unit, wherein each of the movement paths has an essential movement component oriented perpendicularly to a radial direction of the receiving region and at the same time perpendicularly to an axial direction of the receiving region.

19 Claims, 9 Drawing Sheets

Figure 1:
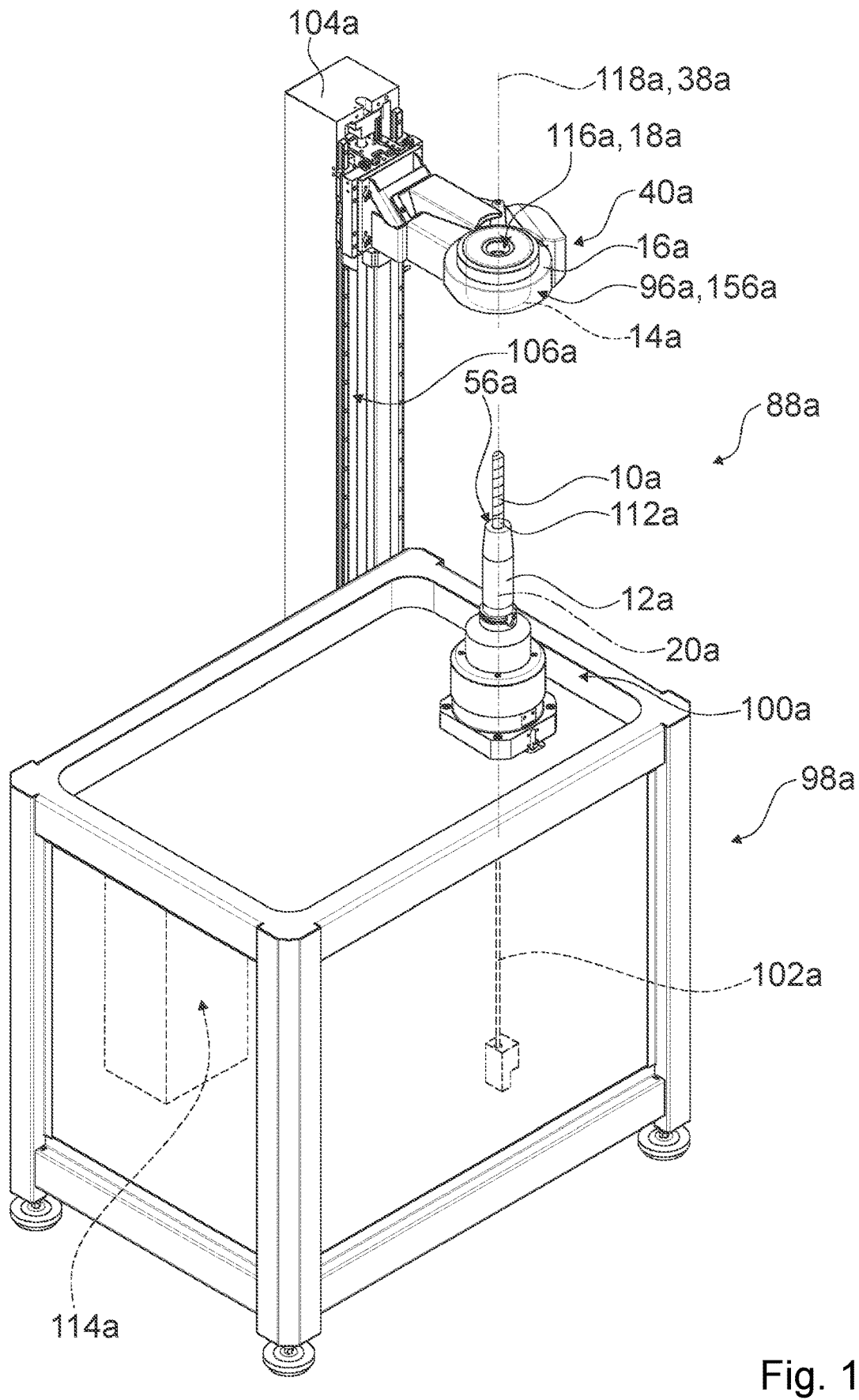

(51) Int. Cl.
*B23P 11/02* (2006.01)
*H05B 6/14* (2006.01)
*H05B 6/38* (2006.01)

(56) References Cited

U.S. PATENT DOCUMENTS

| | | | | |
|---|---|---|---|---|
| 6,861,625 | B1 * | 3/2005 | Haimer | H05B 6/101 |
| | | | | 219/677 |
| 7,115,846 | B2 * | 10/2006 | Haimer | H05B 6/42 |
| | | | | 219/676 |
| 7,208,706 | B2 * | 4/2007 | Haimer | H05B 6/14 |
| | | | | 219/677 |
| 9,278,414 | B2 * | 3/2016 | Haimer | H05B 6/38 |
| 9,550,349 | B1 * | 1/2017 | Larsen | F28F 3/02 |
| 2001/0054471 | A1 * | 12/2001 | Kelch | B23P 11/027 |
| | | | | 156/85 |
| 2005/0205554 | A1 | 9/2005 | Haimer et al. | |
| 2006/0163245 | A1 * | 7/2006 | Pfau | H05B 6/14 |
| | | | | 219/635 |
| 2014/0361008 | A1 | 12/2014 | Haimer et al. | |
| 2015/0151366 | A1 | 6/2015 | Chen | |
| 2016/0113069 | A1 | 4/2016 | Haimer | |
| 2020/0061760 | A1 | 2/2020 | Haimer | |

FOREIGN PATENT DOCUMENTS

| | | |
|---|---|---|
| DE | 20 2018 104 875 U1 | 11/2018 |
| DE | 10 2017 125 047 A1 | 5/2019 |
| JP | 2011-011333 A | 1/2011 |
| WO | 0189758 A1 | 11/2001 |

OTHER PUBLICATIONS

Extended European Search Report dated May 6, 2021, issued in corresponding EP Patent Application No. 20214975.3 (and English Machine Translation).

* cited by examiner

INDUCTION HEATING DEVICE, SHRINK-CLAMPING AND/OR UNSHRINK-UNCLAMPING STATION AND METHOD

CROSS REFERENCE TO RELATED APPLICATION

This application is based on and incorporates herein by reference German Patent Application No. 10 2019 135 618.0 filed on Dec. 20, 2019, and German Patent Application No. 10 2020 129 700.9 filed on Nov. 11, 2020.

STATE OF THE ART

The invention concerns an induction heating device, a shrink-clamping and/or unshrink-unclamping station for tools, a method for operating the induction heating device and a method for manufacturing the induction heating device.

An induction heating device for a shrink-clamping and/or unshrink-unclamping of tools into and/or out of a tool holder has already been proposed, with an induction heating unit which comprises at least one induction coil and is configured, in a shrink-clamping and/or unshrink-unclamping process, to heat-expand at least a portion of a tool holder that is arranged in a receiving region of the induction heating unit, with at least one magnetic flux conducting unit comprising at least one magnetic flux conducting element for a conduction of a magnetic flux generated by the induction coil, and with a bearing unit which is configured at least for a movable support at least of the magnetic flux conducting element, wherein at least a large portion of all points of the magnetic flux conducting element each have a respective movement path that is predetermined by the bearing unit.

The objective of the invention is in particular to provide a generic device with characteristics regarding a magnetic flux conduction during an inductive shrink-clamping and/or unshrink-unclamping of tools. The objective is achieved according to the invention.

ADVANTAGES OF THE INVENTION

The invention is based on an induction heating device for a shrink-clamping and/or unshrink-unclamping of tools into and/or out of a tool holder, with an induction heating unit which comprises at least one induction coil and is configured, in a shrink-clamping and/or unshrink-unclamping process, to heat-expand at least a portion of a tool holder that is arranged in a receiving region of the induction heating unit, wherein the receiving region is in particular oriented at least substantially parallel to designated rotation axes of tool holders which are insertable in the induction heating unit, with at least one magnetic flux conducting unit comprising at least one magnetic flux conducting element for a conduction of a magnetic flux generated by the induction coil, and with a bearing unit which is configured at least for a movable support at least of the magnetic flux conducting element, wherein at least a large portion of all points of the magnetic flux conducting element, preferably all points of the magnetic flux conducting element, each have a respective movement path that is, preferably at least partially, predetermined by the bearing unit, in particular by at least one slotted guide of the bearing unit.

It is proposed that, in particular at least in a moment of a movement of the respective point of the magnetic flux conducting element, preferably in any moment of a movement of the respective point of the magnetic flux conducting element, each of the movement paths, in particular each movement path of all those points of the magnetic flux conducting element having a movement path, has an essential movement component that is oriented perpendicularly to a radial direction of the receiving region, preferably perpendicularly to all radial directions of the receiving region, which are in particular situated in a common plane, preferentially perpendicularly to a radial direction extending through a respective point in an end position of the movement path, and at the same time perpendicularly to an axial direction of the receiving region. This in particular allows achieving an advantageous magnetic flux conduction of the induction magnetic field of the induction coil for a shrink-clamping and/or unshrink-unclamping process of tools into and/or out of tool holders. Advantageously an effective shielding of the induction magnetic field is achievable, via which it can be advantageously ensured that the tool holder is heated and thus expands, and at the same time that a tool which is arranged in the tool holder and is to be unshrunk-unclamped is preferably not heated and thus preferably does not expand thermally. Advantageously the proposed bearing unit enables achieving an especially advantageous flexible arrangement of the magnetic flux conducting elements of the magnetic flux conducting unit, which in particular permits the position of the magnetic flux conducting elements to be adapted to different tool shapes, in particular different shaft diameters of different tools, wherein advantageously a total space requirement of the magnetic flux conducting elements can at the same time be kept preferably low, in particular in a radial plane of the receiving region of the induction heating unit. Moreover, during an induction heating process a preferably gap-free encompassing of the tool, in particular the tool shaft, and thus a preferably effective induction magnetic field shielding, is advantageously achievable by the proposed movement paths. It is furthermore possible, in particular in comparison to magnetic flux conducting elements which are moved towards a tool, in particular the tool shaft, at least substantially radially, to prevent a damaging of the tool and/or of the magnetic flux conducting elements, for example by the magnetic flux conducting elements hitting onto the tool. Advantageously the proposed movement of the magnetic flux conducting elements enables a continuous adjustment of a central opening in the magnetic flux conducting unit. A "magnetic flux" is in particular to mean a magnetic flux, a magnetic field and/or a magnetic flux density.

Preferably none of the movement paths of the points of the magnetic flux conducting element which have a movement path is purely parallel to any radial direction of the receiving region, in particular to any radial direction of the receiving region that starts from the axial direction.

By a "tool holder" is in particular a structural component to be understood which is configured for receiving a tool and for a connection of the tool with a machine. In particular, the tool holder is implemented as a tool-machine interface. Preferentially the tool holder is implemented as a tool chuck, in particular as a shrink-clamp chuck. The tool is in particular realized as a shaft tool, preferentially a rotational shaft tool, for example a drill, a milling tool, a profiling tool and/or a reamer. By a "shrink-clamping of tools into and/or out of tool holders" is in particular a shrink-clamping of tools into tool holders to be understood, in which firstly a tool receiving opening of the tool holder is expanded thermally, then a tool is introduced into the tool receiving opening and eventually, after a cooling-down of the tool holder, the tool is fixated in the tool holder by a force-fit connection, in particular a friction-fit connection. By an "unshrink-unclamping of tools into and/or out of tool holders" is in particular a release of tools fixated in tool holders by means of a force-fit connection, in particular a friction-fit connection, in which—in particular avoiding a simultaneous heating of the tool by the shielding unit—the tool receiving opening of the tool holder is expanded thermally until the tool fixated in the tool holder can be removed from the tool holder.

"At least a portion of the tool holder" is in particular to mean at least a region of the tool holder that comprises the tool receiving opening of the tool holder. The magnetic flux conducting unit is in particular configured for conducting the induction magnetic field of the induction coil, preferably for conducting the induction magnetic field of the induction coil away from the tool that is to be shrink-clamped and/or unshrunk-unclamped, preferably for shielding the induction magnetic field from the tool that is to be shrink-clamped and/or unshrunk-unclamped. In particular, the magnetic flux conducting unit forms a predetermined path for the magnetic flux of the induction magnetic field, in particular for the induction magnetic field. In particular, the magnetic flux conducting unit is configured to at least substantially prevent a heating of the tool during the shrink-clamping process and/or during the unshrink-unclamping process. In particular, an, in particular average, magnetic field intensity of the induction magnetic field of the induction coil on a side of the magnetic flux conducting unit that is situated opposite the induction coil is reduced by at least 80%, preferably by at least 90% and preferentially by at least 99% in comparison to an arrangement without a magnetic flux conducting unit. In particular, the magnetic flux conducting unit comprises a plurality of magnetic flux conducting elements, preferably at least two magnetic flux conducting elements, advantageously at least four magnetic flux conducting elements, preferentially at least six magnetic flux conducting elements and particularly preferably at least eight magnetic flux conducting elements. In particular, the magnetic flux conducting elements of the magnetic flux conducting unit are implemented at least substantially identically to one another. "At least substantially identically" is in particular to mean identically except for production tolerances. However, alternatively at least one magnetic flux conducting element or a plurality of magnetic flux conducting elements may be implemented differently than at least one further magnetic flux conducting element. The magnetic flux conducting element is in particular at least partly implemented of a material that is magnetically conductive and electrically scarcely conductive or non-conductive. In particular, at least a portion of the magnetic flux conducting element has a high magnetic permeability. A relative magnetic permeability of the magnetic flux conducting element, in particular of the magnetically conductive portion of the magnetic flux conducting element, is at least 100, advantageously at least 500, preferentially at least 1,000 and particularly preferably at least 2,000. In particular, the magnetic flux conducting element is implemented at least partly of a ferrimagnetic material. In particular, the magnetic flux conducting element is implemented at least partly of a ferrimagnetic oxide ceramic. In particular, the magnetic flux conducting element is implemented at least partly of a soft-magnetic ferrimagnetic oxide ceramic. For example, the magnetic flux conducting element comprises a NiZn ferrite or a MnZn ferrite. It is in particular conceivable that a portion of the magnetic flux conducting element that faces toward the receiving region is implemented of the ferrimagnetic oxide ceramic and a portion of the magnetic flux conducting element that faces away from the receiving region is implemented of a material that differs from the ferrimagnetic oxide ceramic, for example a synthetic material. In this way good magnetic field conduction is advantageously achievable at preferably low costs. In particular, the magnetic flux conducting element is implemented integrally. Preferentially the magnetic flux conducting element is implemented in one part or monolithic. "Integrally" is in particular to mean connected by substance-to-substance bond, like for example by a welding process and/or gluing process etc., and is especially advantageously to mean injection-molded, like by a production of one cast and/or by a production in a one-component or multi-component injection-molding procedure. "In one part" is in particular to mean formed in one piece. Preferably said one piece is produced from a single blank, a mass and/or a cast, especially preferentially in an injection-molding procedure, in particular a one-component and/or multi-component injection-molding procedure. In particular, the magnetic flux conducting elements are configured for a field formation of the induction magnetic field of the induction coil. Preferentially the magnetic flux conducting elements implement field formation elements. Preferably the magnetic flux conducting unit implements a field formation unit for a formation of the induction magnetic field.

In particular, for a production of the magnetic flux conducting elements first of all blanks of the magnetic flux conducting elements are pressed from a powder, preferably sintered at temperatures above 1000° C. The blanks, preferably in the form of a contiguous disk comprising several magnetic flux conducting elements, preferably all magnetic flux conducting elements of the magnetic flux conducting unit, are then turned. Furthermore, herein in particular a bulge is created on the underside of the magnetic flux conducting elements. After this, by eroding or by another separation procedure, the disk created is divided into segments which then form the individual magnetic flux conducting elements.

In particular, the magnetic flux conducting unit furthermore forms a tool gripper unit. In particular, the magnetic flux conducting elements of the magnetic flux conducting unit form tool gripper elements which are movable relative to one another. In particular, the tool gripper unit formed by the magnetic flux conducting unit is configured to contact a tool shaft by a movement of the magnetic flux conducting elements toward the tool shaft, and to thus grip the tool. In particular, the tool gripper unit formed by the magnetic flux conducting unit is configured to grip the tool, in particular with its tool shaft, by a variation of an opening diameter of a central opening, i.e. an inner opening, of the magnetic flux conducting unit. In particular, the tool gripper unit is configured to insert the tool into the tool holder in a shrink-clamping process and/or to remove the tool out of the tool holder in an unshrink-unclamping process. It is in particular conceivable that the tool gripper unit, i.e. the magnetic flux conducting unit, is implemented to be separable from the portion of the induction heating unit that comprises the induction coil. By the magnetic flux conducting unit also forming a tool gripper unit a high degree of flexibility is advantageously achievable. Moreover, an especially quick insertion and/or removal of the tool into and/or from the tool holder is advantageously achievable, which advantageously allows saving energy.

A "receiving region of the induction heating unit" is in particular to mean an at least substantially straight opening within the induction heating unit. Preferably at least a large portion of the magnetic flux, preferably the entire magnetic flux, runs through an opening plane of the receiving region, in particular an arbitrary opening plane of the receiving region. Preferentially at least substantially all magnetic field lines of the induction magnetic field run through the receiving region of the induction heating unit once. In particular, the receiving region of the induction heating unit is oriented at least substantially parallel to a coil axis of the induction coil of the induction heating unit. In particular, the receiving region is arranged at least substantially parallel to a longitudinal axis and/or to a main extension direction of the tool holders and/or tools which are insertable in the induction heating unit. By a "main extension direction" of an object is herein in particular a direction to be understood which extends parallel to a longest edge of a smallest rectangular cuboid just still completely enclosing the object. In particular, the induction coil is embodied as a cylindrical coil and/or as a solenoid. The induction heating unit is in particular configured for generating an induction magnetic field, preferably an, in particular high-frequency, alternating magnetic field. In particular, the material of the, preferably metallic, tool holder interacts with the induction magnetic field and is thereby heated up. "Substantially parallel" is here in particular to mean an orientation of a direction relative to a reference direction, in particular in a plane, wherein the direction has a deviation relative to the reference direction that is in particular smaller than 8°, advantageously smaller than 5° and especially advantageously smaller than 2°. In particular, the bearing unit is configured to support the magnetic flux conducting element, preferably all magnetic flux conducting elements, such that they are linearly movable, preferably exclusively linearly movable. Alternatively, it is conceivable that at least a portion of the points of the magnetic flux conducting element have a movement path that is realized as a superposition of a linear movement and a rotation movement around a rotation axis. A "large portion" is to mean in particular 51%, preferably 66%, preferentially 80% and especially preferentially 95%. In particular, if all points of the magnetic flux conducting element have a movement path, no point of the magnetic flux conducting element is free of a movement path. Preferably the magnetic flux conducting element is free of stationary points. Preferentially the magnetic flux conducting element is free of points which remain immobile in case of a movement of any other point of the magnetic flux conducting element and which, for example, intersect only with a rotation axis of the magnetic flux conducting element. In particular, in all possible movements predetermined by the bearing unit always all points of the magnetic flux conducting element move.

By an "essential movement component" is in particular a movement component, in particular a movement direction component, to be understood, comprising at least 5%, preferably at least 10%, advantageously at least 20%, preferentially at least 30% and particularly preferably at least 50% of a total movement, in particular of a total movement direction, in particular in an orthogonal, preferably two-dimensional or three-dimensional, vector resolution of the total movement, in particular of the total movement direction. In particular, the movement component that is perpendicular to the radial direction of the receiving region is realized as a portion of the total movement that goes in a direction perpendicular to the radial direction of the receiving region, preferably perpendicular to all possible radial directions of the receiving region. In particular, the movement component that is perpendicular to the axial direction of the receiving region is realized as a portion of the total movement that goes in a direction perpendicular to the axial direction of the receiving region. In particular, the movement component that is at the same time perpendicular to the axial direction of the receiving region and perpendicular to the radial direction of the receiving region is realized as a portion of the total movement which goes at the same time in a direction that is perpendicular to the axial direction of the receiving region and perpendicular to the radial direction of the receiving region, preferably perpendicular to all possible radial directions of the receiving region. In particular, the radial direction runs radially to a coil axis of the induction coil of the induction heating unit. In particular, the radial directions extend from the coil axis outward in the way of spokes. In particular, the axial direction extends at least substantially parallel to a longitudinal direction, to a rotation symmetry axis and/or to a main extension direction of the receiving region. In particular, the axial direction runs at least substantially parallel to a coil axis of the induction coil of the induction heating unit. In particular, the radial direction of the receiving region that is allocated to a movement path of a point extends through the respective point if said point is arranged in one of the end positions of the movement path.

In particular, at least in a projection onto a plane that is situated at least substantially perpendicularly to the axial direction of the receiving region, all linear movement paths, of the family of movement paths predetermined by the bearing unit, in particular all such linear movement paths at least of the points of the magnetic flux conducting elements having a movement path, are angled relative to a radial direction of the receiving region of the induction heating unit, preferably angled relative to all possible radial directions of the receiving region of the induction heating unit.

In particular, imaginary straight prolongations of all linear movement paths of the family of movement paths predetermined by the bearing unit, in particular at least of the points of the magnetic flux conducting elements having a movement path, are free of intersection points with an axial direction of the receiving region of the induction heating unit.

In particular, at least in a projection onto the plane situated at least substantially perpendicularly to the axial direction of the receiving region, all linear movement paths of the family of movement paths predetermined by the bearing unit, in particular at least of the points of the magnetic flux conducting elements having a movement path, have a component that is tangential to a radial direction of the receiving region of the induction heating unit.

The magnetic flux conducting element is in particular free of points whose movement paths extend purely parallel to the radial direction of the receiving region during an adjustment of the position of the magnetic flux conducting element. The magnetic flux conducting element is in particular free of points whose movement paths extend during an adjustment of the position of the magnetic flux conducting element purely parallel to at least one radial direction of all conceivable radial directions of the receiving region. The magnetic flux conducting element is in particular free of points whose movement paths are directed to a major extent (e. g. by more than 90%) or exclusively towards the center of the coil opening during an adjustment of the position of the magnetic flux conducting element.

Furthermore, it is proposed that at least one of the movement paths of the points of the magnetic flux conducting element, which in particular have a movement path, is a purely linear movement path. This enables creating an advantageous possibility for an adjustment of the magnetic flux conducting unit, which in particular permits a gap-free encompassing of a tool and/or tool holder, and/or which is in particular implemented in a particularly space-saving manner. Preferentially all movement paths of points of the magnetic flux conducting element are purely linear movement paths. In particular, the purely linear movement path is free of bends and/or curvatures.

If the at least one purely linear movement path runs at least substantially perpendicularly to the radial direction of the receiving region of the induction heating unit, preferably perpendicularly to all conceivable radial directions of the receiving region of the induction heating unit, this advantageously enables achieving an especially simple implementation of a magnetic flux conducting unit that is adjustable in a space-saving fashion. Preferentially all purely linear movement paths, preferably all movement paths, extend from points of the magnetic flux conducting element perpendicularly to the radial direction of the receiving region of the induction heating unit. In particular, the at least one purely linear movement path extends tangentially to the receiving region, in particular to an enveloping contour of the axial direction that encloses the axial direction of the receiving region cylindrically. Preferably all purely linear movement paths extend tangentially to the receiving region, in particular to the enveloping contour of the axial direction that encloses the axial direction of the receiving region cylindrically. Preferably all movement paths extend tangentially to the receiving region, in particular to the enveloping contour of the axial direction that encloses the axial direction of the receiving region cylindrically.

It is further proposed that each of the movement paths, in particular each movement path of all those points of the magnetic flux conducting element which have a movement path, extends in a movement plane that is situated at least substantially perpendicularly to the axial direction of the receiving region. In this way an especially advantageous magnetic flux conduction, in particular shielding of the induction magnetic field, is achievable. In particular, an at least substantially planar support of the magnetic flux conducting elements on a runout of the tool holder is achievable. Advantageously a planar support of the magnetic flux conducting elements is enabled on the runout, in particular on a planar surface of the tool holder. It is advantageously possible that, of a tool that is accommodated in the tool holder and is in particular to be unshrunk-unclamped, a portion that protrudes beyond the tool holder and is arranged between the upper end of the tool holder, in particular the runout of the tool holder, and the magnetic flux conducting unit, in particular an underside of the magnetic flux conducting elements of the magnetic flux conducting unit, said underside preferentially facing towards the induction coil, can be kept preferably small. Advantageously it is possible that the magnetic flux conducting unit can be laid upon the tool holder in a gap-free manner. In particular, a movement of the magnetic flux conducting elements of the magnetic flux conducting unit is realized at least substantially in a single plane, which preferably extends parallel to the radial directions of the receiving region. In particular, the movement plane is situated at least substantially parallel to the radial directions of the receiving region of the induction heating unit. "At least substantially parallel" is here in particular to mean an orientation of a direction relative to a reference direction, in particular in a plane, wherein the direction has a deviation relative to the reference direction that is in particular smaller than 8°, advantageously smaller than 5° and especially advantageously smaller than 2°.

In addition, it is proposed that the magnetic flux conducting element is supported in a non-pivotable manner. In this way an especially simple implementation of the induction heating device may advantageously be enabled, as a result of which costs and malfunctioning can be kept at an advantageously low level. In particular, a risk of a wedging of the magnetic flux conducting element is thus considerably reduced. In particular, the support by the bearing unit prevents a pivoting movement of the magnetic flux conducting element, in particular of all magnetic flux conducting elements of the magnetic flux conducting unit.

As an alternative to this, it is proposed that, except for the at least one purely linear movement path, at least a large portion of all further movement paths of the magnetic flux conducting element are curved. In this way an especially high degree of compactness of the magnetic flux conducting unit realized by the magnetic flux conducting elements is achievable, in particular with a central opening—and/or a variation range of the central opening—being at the same time as large as possible. Advantageously a ratio of a maximum outer diameter of the magnetic flux conducting unit and a maximum opening diameter of the central opening of the magnetic flux conducting unit can be minimized. In particular, all further (not purely linear) movement paths of the magnetic flux conducting element, preferably of all magnetic flux conducting elements of the magnetic flux conducting unit, are curved in a same direction. In particular, viewed from an underside of the magnetic flux conducting unit, all further (not purely linear) movement paths of the magnetic flux conducting element, preferably of all magnetic flux conducting elements of the magnetic flux conducting unit, are righthand-curved. Alternatively, a lefthand-curvature of the movement paths is of course also conceivable. In particular, preferably at least from a first deviation from a linear movement on, the movement paths are monotonously and/or continuously curved. In particular, the curvature of at least one movement path, in particular of the movement paths, varies along the movement path, in particular along the movement paths.

It is also proposed that a curvature of the curved movement paths, in particular of at least one curved movement path, increases during a movement of the allocated magnetic flux conducting element toward a center of the induction heating unit. In this way an especially high compactness of the magnetic flux conducting unit implemented by the magnetic flux conducting elements is achievable. Advantageously, it is achievable that the magnetic flux conducting elements are closely adjacent to each other, also with small opening diameters of the central opening of the magnetic flux conducting unit. In particular, along the movement path, preferably at least along a second half of the movement path, which in particular describes a closure movement of the magnetic flux conducting unit, (from the middle of the movement path to an end of the movement path in which the magnetic flux conducting element is arranged in a point of minimum distance to a center of the opening of the magnetic flux conducting unit), a curvature of the curved movement path increases by at least 25%, preferably by at least 50%, preferentially by at least 75% and especially preferentially by at least 100%.

Moreover, it is proposed that the bearing unit comprises an, in particular at least substantially straight, slotted guide for a limitation of a freedom of movement at least of the magnetic flux conducting element. This advantageously enables a particularly simple implementation of the induction heating device, as a result of which costs and malfunctioning can be kept at an advantageously low level. A "slotted guide" is in particular to mean a guidance of the magnetic flux conducting element during an adjustment in a guide slot, in particular a guide rail. Preferentially a movement of the magnetic flux conducting element deviating from the course of the guide slot is prevented. In particular, each magnetic flux conducting element of the magnetic flux conducting unit has an, in particular separate, slotted guide. In particular, each magnetic flux conducting element of the magnetic flux conducting unit has an, in particular separate, guide slot, preferably guide rail.

If the bearing unit comprises at least one second slotted guide, which is allocated to the at least one magnetic flux conducting element, which is in particular at least substantially straight and which is in particular oriented at least substantially parallel to the slotted guide, advantageously an especially reliable guidance of the magnetic flux conducting elements is achievable. It is furthermore advantageously possible to prevent an, in particular free, turning and pivoting of the magnetic flux conducting elements. Advantageously thus a wedging is preventable and a high degree of reliability is achievable. Preferentially at least one first slotted guide and at least one second slotted guide are allocated to each magnetic flux conducting element. Preferably at least one first guide slot, in particular guide rail, and at least one second guide slot, in particular guide rail, are allocated to each magnetic flux conducting element. In particular, the slotted guides of different magnetic flux conducting elements are implemented separately from one another. If, however, as an alternative the possibility of pivoting the magnetic flux conducting elements is to be retained, it is provided to dispense with the second slotted guide.

If the magnetic flux conducting unit comprises at least one further magnetic flux conducting element, which is arranged neighboring the magnetic flux conducting element, in particular in a common movement plane, it is advantageously possible to achieve a particularly flexible arrangement of the magnetic flux conducting unit and/or a particularly flexibly adaptable shielding of the induction magnetic field. "Neighboring" is in particular to mean directly neighboring and/or arranged directly side by side.

It is also proposed that, in particular in all operation states of the magnetic flux conducting unit, the magnetic flux conducting element is free of overlap with any further magnetic flux conducting elements of the magnetic flux conducting unit. In this way an especially high efficiency of material utilization is advantageously achievable, as a result of which it is in particular possible to keep costs at a low level. Advantageously a planar support of the magnetic flux conducting elements on the runout, in particular on a planar surface, of the tool holder can be made possible, which advantageously enables achieving an especially effective shielding of the induction magnetic field from a tool that is to be unshrunk-unclamped, in particular preventing a heating-up of the tool during an unshrinking-unclamping process. In particular, upper sides and/or undersides of the magnetic flux conducting elements are free of overlap in all operation states of the magnetic flux conducting unit. In particular, the magnetic flux conducting elements are free of overlap, at least viewed in the axial direction, in all operation states of the magnetic flux conducting unit. In particular, in all conceivable operation states of the magnetic flux conducting unit, viewed in the axial direction, none of the magnetic flux conducting elements covers a further magnetic flux conducting element of the magnetic flux conducting unit partially or completely.

Beyond this it is proposed that neighboring magnetic flux conducting elements of the magnetic flux conducting unit are closely adjacent to one another in all positions that can be set by the bearing unit. In this way a preferably gap-free encompassing of the tool and/or of the tool holder in the circumferential direction is advantageously achievable. As a result, an especially effective magnetic flux conduction, preferably induction magnetic field shielding, is advantageously achievable. In particular, a gap, in particular a minimum gap, between directly neighboring magnetic flux conducting elements is smaller than 0.5 mm, preferably smaller than 0.25 mm and preferentially smaller than 0.1 mm, in particular in all possible operation states of the magnetic flux conducting unit. Especially preferentially neighboring magnetic flux conducting elements contact each other in all possible operation states. In particular, the neighboring magnetic flux conducting elements contact each other in all possible operation states (exclusively) at side edges, preferably contact edges, which preferentially run at least partially perpendicularly to the movement plane of the magnetic flux conducting elements. In particular, the magnetic flux conducting element may comprise a slide surface, for example a slide coating, on contact edges. This advantageously allows keeping wear-down at a low level.

It is also proposed that a straight prolongation of an, in particular arbitrary, purely linear movement path of the family of movement paths of the magnetic flux conducting element which are predetermined by the bearing unit, in particular in the common movement plane, preferentially a straight prolongation of a first guide slot of the magnetic flux conducting element, includes an angle $\alpha$ with a straight prolongation of an, in particular arbitrary, further purely linear movement path of a further family of further movement paths of the further magnetic flux conducting element which are predetermined by the bearing unit, in particular with a straight prolongation of a first guide slot of the further magnetic flux conducting element. In this way an especially simple implementation of a magnetic flux conducting unit, which is adjustable in a space-saving fashion and at the same time encompasses a tool that is to be unshrunk-unclamped in a preferably gap-free manner, is advantageously achievable.

If the angle $\alpha$ then at least substantially fulfills a formula $\alpha = 360°/N_M$, $N_M$ being equivalent to a total number of all magnetic flux conducting elements of the magnetic flux conducting unit, an especially easily adjustable and particularly effective shielding of the induction magnetic field is achievable.

It is moreover proposed that a straight prolongation of a purely linear movement path, of the family of movement paths of the magnetic flux conducting element which are predetermined by the bearing unit, runs parallel to a straight prolongation of an additional further purely linear movement path, of a further family of further movement paths which are predetermined by the bearing unit, of an additional further magnetic flux conducting element of the magnetic flux conducting unit, which is in particular arranged such that it is not directly neighboring on the magnetic flux conducting element, wherein these two straight prolongations are arranged on opposite-situated sides of the axial direction and/or of a center of the magnetic flux conducting unit. In this way in particular an advantageous force distribution is achievable within the magnetic flux conducting unit during an adjustment of the positions of the magnetic flux conducting elements. In particular, an advantageous movement of the magnetic flux conducting elements relative to one another is achievable for a setting of an opening diameter of the central opening in the magnetic flux conducting unit. In particular, the additional further magnetic flux conducting element is arranged on a side of the magnetic flux conducting unit that is situated, in particular relative to the central opening in the magnetic flux conducting unit, opposite the magnetic flux conducting element. In particular, the size and/or the diameter of the central opening are/is continuously increasable and reducible by an adjustment of the positions of the magnetic flux conducting elements relative to one another. In particular, the size and/or the diameter of the central opening are/is continuously variable between a maximum opening diameter of the inner opening and a minimum opening diameter of the inner opening via an adjustment of the positions of the magnetic flux conducting elements relative to one another. In particular, there is at least one straight prolongation of a purely linear movement path of a magnetic flux conducting element, preferentially there are at least two straight prolongations of purely linear movement paths of magnetic flux conducting elements, intersecting with the purely linear movement path of the magnetic flux conducting element and/or of the additional further magnetic flux conducting element in an at least substantially perpendicular fashion. The term "substantially perpendicularly" is here in particular meant to define an orientation of a direction relative to a reference direction wherein, in particular viewed in a projection plane, the direction and the reference direction include an angle of 90° and the angle has a maximum deviation that is in particular smaller than 8°, advantageously smaller than 5° and especially advantageously smaller than 2°.

Furthermore, it is proposed that the magnetic flux conducting elements of the magnetic flux conducting unit are configured to circumferentially encompass a tool arranged in the induction heating unit or a tool holder arranged in the induction heating unit in such a way that, in particular independently from a dimension of the circumference of the tool or the tool holder, preferably in any operation state of the magnetic flux conducting unit, the encompassing is at least substantially gap-free. In this way a particularly effective magnetic flux conduction, in particular a particularly effective induction magnetic field shielding, is advantageously achievable. "At least substantially gap-free" is in particular to mean free of gaps, in a radial direction or in a direction that is at least substantially parallel to the radial direction, which are larger than 1 mm, preferably larger than 0.5 mm, preferentially larger than 0.25 mm and especially preferentially larger than 0.1 mm. In particular, except for an inner opening for receiving a tool, the magnetic flux conducting unit is free of a gap between magnetic flux conducting elements whose size or width substantially changes during an adjustment of the magnetic flux conducting unit, in particular during an adjustment of the size of the inner opening of the magnetic flux conducting unit.

Moreover, if the magnetic flux conducting elements of the magnetic flux conducting unit are configured to form the inner opening that is adjustable in size, a high degree of flexibility of the induction heating device is advantageously achievable. Advantageously, the opening can be adapted to different tool diameters, in particular shaft diameters of tools. Advantageously a particularly effective induction magnetic field shielding is achievable. In particular, the adjustable inner opening has an at least substantially round or polygonal shape, the polygonal shape preferentially having a number of corners that corresponds to a total number of magnetic flux conducting elements. In particular, the inner opening is delimited in its circumferential direction by a respective side edge, preferably by precisely one side edge respectively, of each magnetic flux conducting element. Preferentially the inner opening is delimited only by portions of the respective lefthand side edges of the magnetic flux conducting elements, as viewed in a top view onto the magnetic flux conducting unit. Alternatively, the inner opening may be delimited only by portions of the respective righthand side edges of the magnetic flux conducting unit, as viewed in a top view onto the magnetic flux conducting unit. Especially preferentially the inner opening is delimited only by portions of the side edges, as viewed in a top view onto the magnetic flux conducting unit, which respectively form the side edges of those respective magnetic flux conducting elements which are situated at least substantially in a closing direction of the magnetic flux conducting elements for a closing of the inner opening. In particular, a portion of a side edge that delimits the inner opening is proportional to a diameter of the inner opening. In particular, a portion of a side edge that delimits the inner opening increases steadily with an increasing diameter of the inner opening and vice versa.

It is further proposed that a difference between a maximum outer diameter, within which all magnetic flux conducting elements of the magnetic flux conducting unit are arranged in all positions which can be set by the bearing unit, and a maximum opening diameter of the inner opening amounts to maximally 160%, advantageously maximally 150%, preferably maximally 140%, preferentially maximally 130% and especially preferentially no more than 120% of the maximum opening diameter and/or of a maximum edge length of one of the magnetic flux conducting elements, in particular of the edge length of the side edge of the magnetic flux conducting element that delimits the opening. This advantageously enables providing an especially compact and/or space-saving while flexibly adjustable magnetic flux conducting unit, in particular shielding unit. It is in this way advantageously possible for costs and/or a weight of the induction heating device to be kept at a low level. In particular, the maximum outer diameter is implemented as a diameter of a minimum circumcircle within which all, in particular overlap-free, magnetic flux conducting elements can be arranged in any possible operation states of the magnetic flux conducting unit. In particular, the maximum outer diameter is the outer diameter of the magnetic flux conducting unit in a maximally opened state. In particular, the maximally opened state is predetermined by the guide slot(s). In particular, a minimally opened state is also predetermined by the guide slot(s). In particular, the magnetic flux conducting elements are at an outer abutment of the guide slot(s) when the maximum outer diameter of the magnetic flux conducting unit and/or the maximum opening diameter of the inner opening are set.

Furthermore it is proposed that, in particular viewed in the top view onto the magnetic flux conducting unit, the magnetic flux conducting elements of the magnetic flux conducting unit form in a synopsis, in particular depending on a position of the magnetic flux conducting elements along the guide slots, a sawblade-like shape or an isogon shape, in particular with a number of corners that corresponds to a total number of magnetic flux conducting elements of the magnetic flux conducting unit. This advantageously allows providing an especially compact and/or space-saving while flexibly adjustable magnetic flux conducting unit, in particular shielding unit. In this way it is advantageously possible to keep costs and/or a weight of the induction heating device at a low level. By a "sawblade-like shape" is in particular a shape to be understood which is at least substantially round and which has, on edges situated in a radial direction outwards, sawteeth, in particular sawteeth with undercuts in the radial direction. In particular, the sawblade-like shape is realized as a shape essentially similar to a shape of a sidewise silhouette of a bucket wheel as it is used, for example in a bucket wheel excavator.

Beyond this it is proposed that, in particular viewed in the top view onto the magnetic flux conducting unit, the magnetic flux conducting element has a shape of an, in particular acute-angled, isosceles triangle or a shape of an, in particular acute-angled, isosceles triangle in which a corner opposite the vertex of the isosceles triangle has been cut off in a straight or rounded manner. In this way it is advantageously possible to provide a particularly compact and/or space-saving while flexibly adjustable magnetic flux conducting unit, in particular shielding unit. This advantageously allows keeping costs and/or a weight of the induction heating device at a low level.

If moreover the magnetic flux conducting unit realizes a shielding unit for a shielding of the induction magnetic field of the induction heating unit, in particular in an axial direction of the receiving region of the induction heating unit, an effective shielding of the induction magnetic field is advantageously achievable, by which it can advantageously be ensured that the tool holder is heated up, which means expands thermally, and at the same time a tool that is arranged in the tool holder and is to be unshrunk-unclamped is preferably not heated up, which means that it preferably does not expand thermally. In particular, the magnetic flux conducting elements respectively realize shielding elements. In particular, the shielding unit is configured at least for shielding the induction magnetic field of the induction coil in the axial direction of the induction heating unit, in particular towards the coil axis of the induction coil, and preferably for shielding said induction magnetic field from tools which are introduced in the tool holder. A "shielding" of an induction magnetic field is in particular to mean a shielding of at least 80%, preferentially at least 90% and preferably at least 99% of the induction magnetic field.

It is also proposed that the magnetic flux conducting unit is arranged in the axial direction of the receiving region above or below the induction coil of the induction heating unit, in particular all induction coils of the induction heating unit. In this way it is advantageously possible to achieve an effective magnetic flux conduction and/or shielding of the induction magnetic field in the axial direction of the receiving region of the induction heating unit. It is in particular conceivable that the induction heating device comprises a further magnetic flux conducting unit, which is in particular implemented at least substantially identically to the magnetic flux conducting unit and which is preferentially arranged on a side of the induction heating unit, in particular of the induction coil, that is situated opposite the position of the magnetic flux conducting unit. Preferably the magnetic flux conducting unit is arranged in the axial direction of the receiving region above the induction coil. In addition, the further magnetic flux conducting unit may in particular be arranged below the induction coil.

If the magnetic flux conducting element of the magnetic flux conducting unit is implemented at least partially of a ferrimagnetic oxide ceramic, an especially effective magnetic flux conduction and/or shielding effect is advantageously achievable.

Furthermore, it is proposed that the bearing unit realizes, between end positions of the movement paths, at least one latch position for the magnetic flux conducting unit, in particular for the magnetic flux conducting elements of the magnetic flux conducting unit. In this way an adjustment of an opening diameter of the inner opening fitting for a tool and/or to a tool holder, in particular in case of a manual adjustment of the opening diameter, can advantageously be facilitated. This advantageously enables ensuring effective shielding of the induction magnetic field. Advantageously it is in this way possible to prevent a damaging of the tool, of the tool holder and/or of the magnetic flux conducting unit, in particular the magnetic flux conducting elements, for example caused by a crashing of the magnetic flux conducting elements and the tool and/or the tool holder against one another. In particular, the bearing unit comprises a plurality of latch positions, preferentially at least ten latch positions, between the end positions of the movement paths. Preferably the latch positions correspond to opening diameters of the inner opening which are adapted to standardized tool shaft diameters, in particular to standardized tool shaft diameters of tools which are clampable via a hydraulic-expansion procedure. In particular, the latch positions correspond to opening diameters of the inner opening which are adapted at least to tool shaft diameters of 4 mm, 6 mm, 8 mm, 10 mm, 12 mm, 14 mm, 16 mm, 20 mm, 25 mm and/or 32 mm. Alternatively or additionally the latch positions may be adapted to standardized inch sizes, which are in particular situated between the metric sizes mentioned above. In particular, it is possible for the magnetic flux conducting elements, in a manually or automatedly driven manner, to be brought into the latch positions and/or the end positions and/or to be releasable from the latch positions and/or the end positions.

Furthermore, a shrink-clamping and/or unshrink-unclamping station for tools, in particular a presetting and/or measuring apparatus for tools with a shrink-clamping and/or unshrink-unclamping station for tools, comprising the induction heating device, is proposed. This advantageously enables an especially efficient, quick and/or reliable shrink-clamping. By a "shrink-clamping and/or unshrink-unclamping station for tools" is in particular a device to be understood which is configured to carry out a shrink-clamping process and/or an unshrink-unclamping process of tools in tool holders in an at least largely automated, preferably fully automated, manner. The shrink-clamping process in particular comprises all steps necessary for a fixation of the tool in the tool holder, in particular including the insertion and/or removal of tool and tool holder into and/or out of the shrink-clamping and/or unshrink-unclamping station. The unshrink-unclamping process in particular comprises all steps necessary for a releasing of the tool out of the tool holder, in particular including the insertion and/or removal of tool and tool holder into and/or out of the shrink-clamping and/or unshrink-unclamping station. By a "presetting and/or measuring apparatus for tools" is in particular an apparatus to be understood which is at least configured for at least partly capturing and/or presetting at least a length, at least an angle, at least a contour and/or at least an outer shape of a tool, preferably configured for carrying out a setting, in particular a presetting, of a tool, in particular in the tool holder, for example in regard to a length and/or situation of the tool with respect to the tool holder.

If the shrink-clamping and/or unshrink-unclamping station and/or the induction heating unit comprise/comprises a motorically driven adjusting unit, which is configured, for the purpose of setting the opening diameter of the inner opening of the magnetic flux conducting unit, to move at least the magnetic flux conducting element, in an at least semi-automated manner, along the movement paths predetermined by the bearing unit, it is then advantageously possible to implement a simple, reliable, non-error-prone adjustment and/or adaption of the magnetic flux conducting unit to a tool that is to be unshrunk-unclamped. Advantageously an automatization will lead to an increased processing speed and thus to a reduction of costs. In particular, the shrink-clamping and/or unshrink-unclamping station and/or the induction heating unit comprise/comprises a control and/or regulation unit, which is at least configured to control and/or regulate the motorically driven adjusting unit, preferably while aiming at different diameter settings of the magnetic flux conducting unit, in particular different latch positions and/or end positions of the magnetic flux conducting unit, in a program-controlled manner. A "control and/or regulation unit" is in particular to mean a unit with at least one control electronics component. A "control electronics component" is in particular to mean a unit with a processor unit and with a memory unit and with an operation program that is stored in the memory unit. In particular, the motorically driven adjusting unit permits a continuous setting of the opening diameter of the inner opening, preferentially without using the latch positions. In this way advantageously an optimum opening diameter is individually adjustable for each tool. In particular, it is conceivable that the motorically driven adjusting unit reduces the opening diameter of the inner opening by an adjustment of the magnetic flux conducting elements until a contact between the magnetic flux conducting elements and the tool and/or the tool holder is detected, in particular via the control and/or regulation unit.

Beyond this a method for operating an induction heating device is proposed, in which in at least one method step at least a portion of a tool holder that is arranged in a receiving region of the induction heating unit is expanded by inductive heating in a shrink-clamping and/or unshrink-unclamping process, wherein the receiving region is in particular oriented parallel to rotation axes of tool holders which are insertable into the induction heating unit, wherein in at least one further method step a spreading of an induction magnetic field of the induction heating unit in an axial direction of the receiving region above and/or below the induction heating unit is shielded by the magnetic flux conducting elements of the magnetic flux conducting unit and wherein, for an adjustment of the magnetic flux conducting elements relative to the tool holder, all points of the magnetic flux conducting element are moved along movement paths, each of which has an essential movement component that is oriented perpendicularly to the radial direction of the receiving region and at the same time perpendicularly to the axial direction of the receiving region.

Furthermore, a method for producing the induction heating device is proposed, wherein at least the magnetic flux conducting element is manufactured in at least one method step at least partly by an additive manufacturing procedure, in particular by a 3D-printing procedure. This advantageously allows achieving an especially high flexibility in a production and/or in an implementation of the magnetic flux conducting elements.

The induction heating device according to the invention, the shrink-clamping and/or unshrink-unclamping station according to the invention and/or the methods according to the invention shall herein not be limited to the application and implementation described above. In particular, to fulfill a functionality that is described here, the induction heating device according to the invention, the shrink-clamping and/or unshrink-unclamping station according to the invention and/or the methods according to the invention may comprise a number of individual elements, structural components and units that differs from a number given here.

DRAWINGS

Further advantages will become apparent from the following description of the drawings. In the drawings two exemplary embodiments of the invention are shown. The drawings, the description and the claims contain a plurality of features in combination. Someone skilled in the art will purposefully also consider the features separately and will find further expedient combinations.

Figure 2:
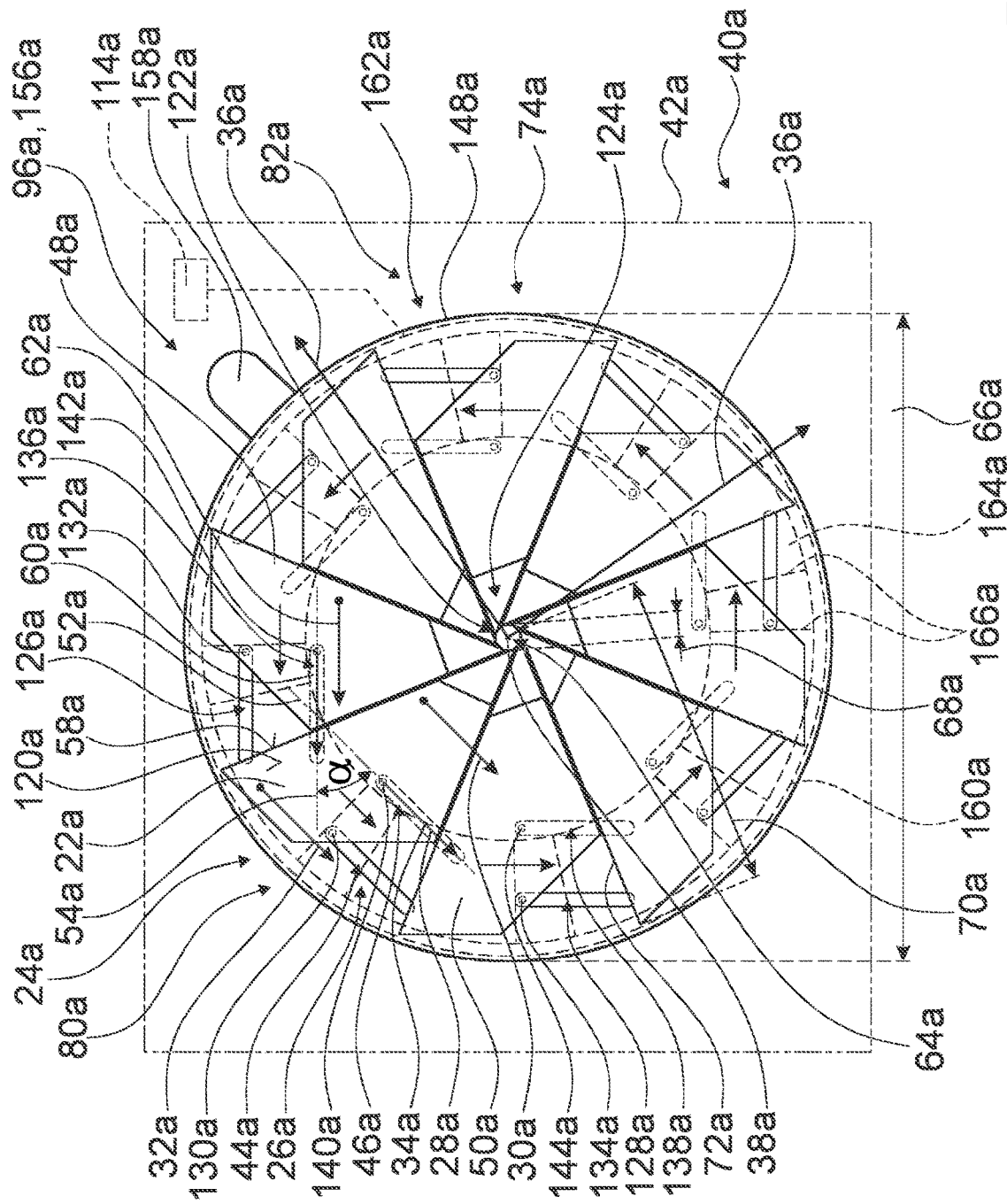
Figure 3:
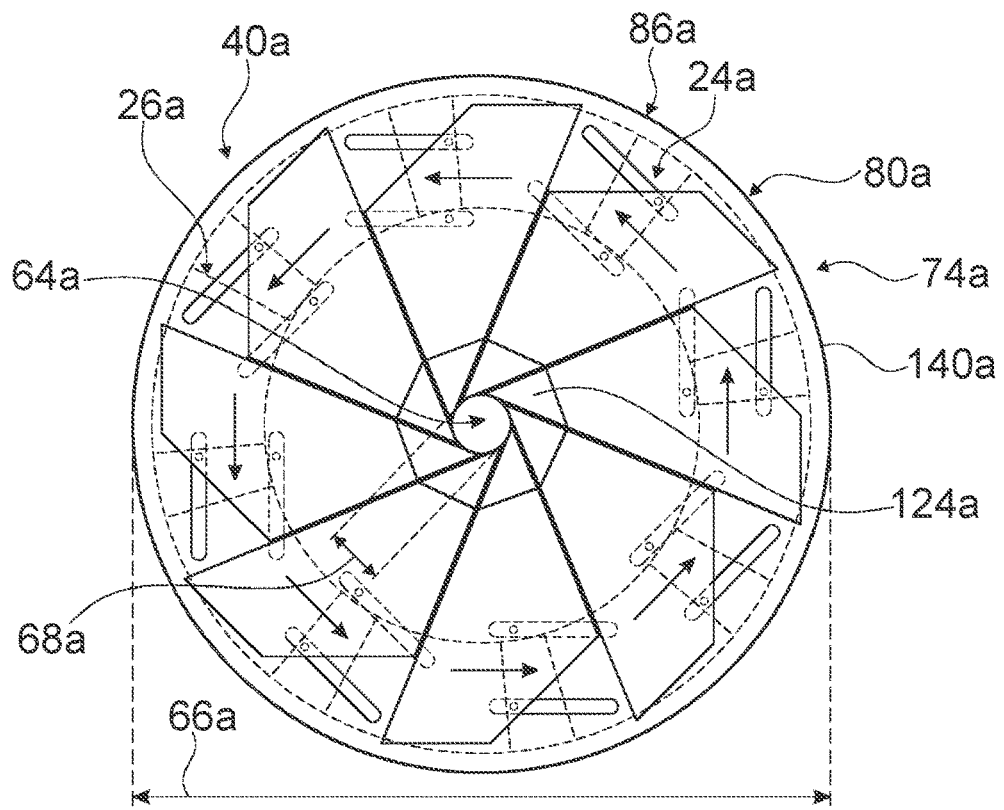
Figure 4:
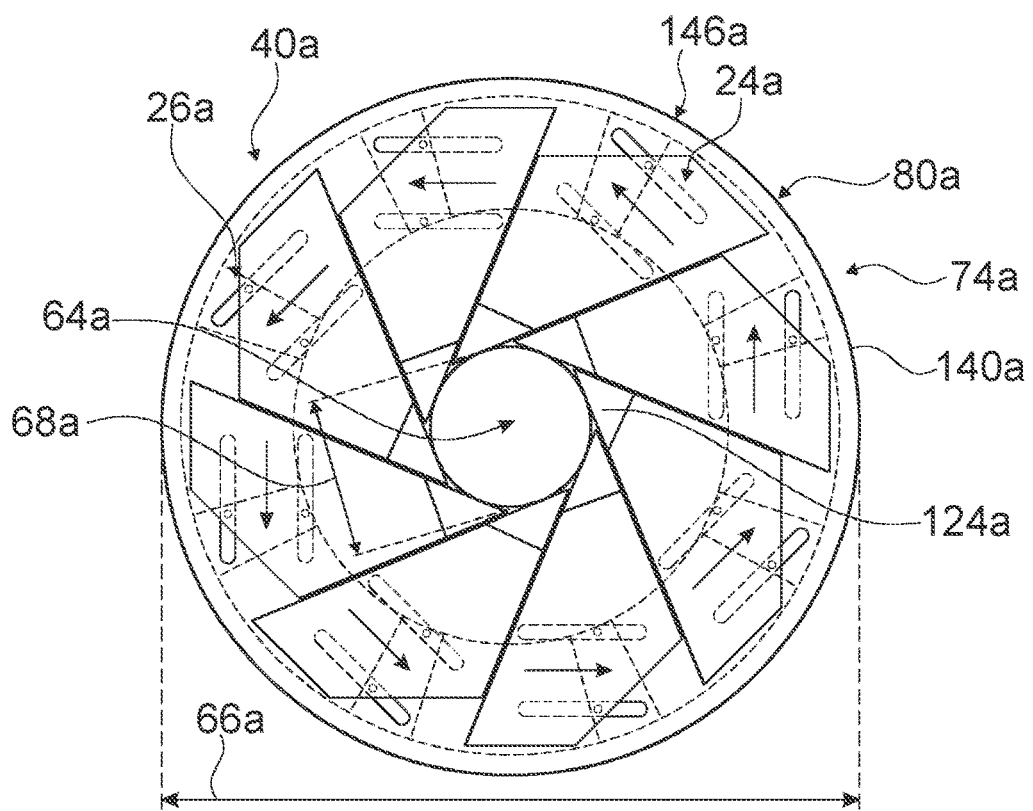
Figure 5:
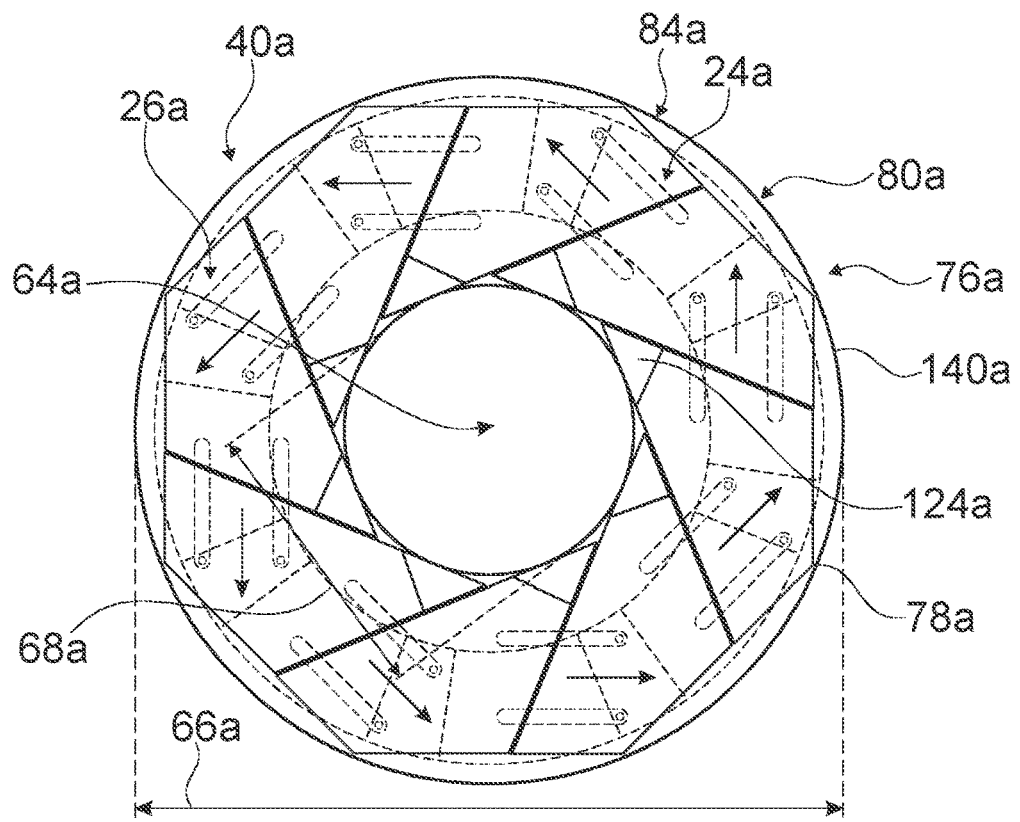
Figure 6:
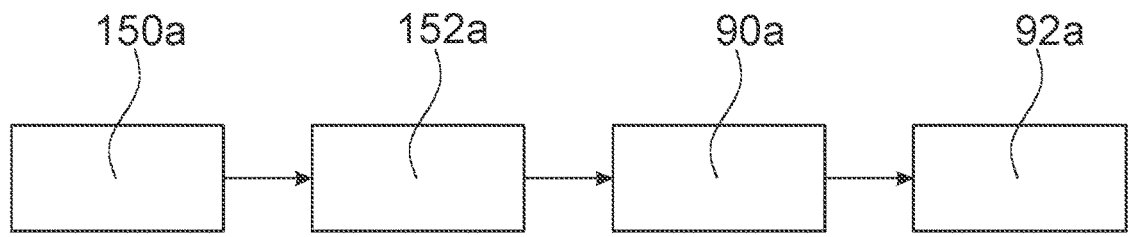
Figure 7:
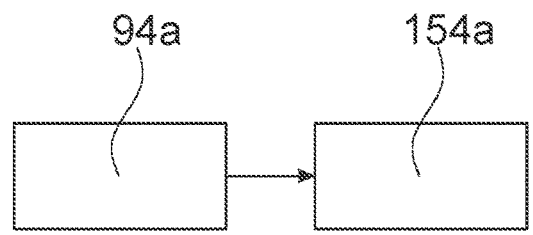
Figure 8:
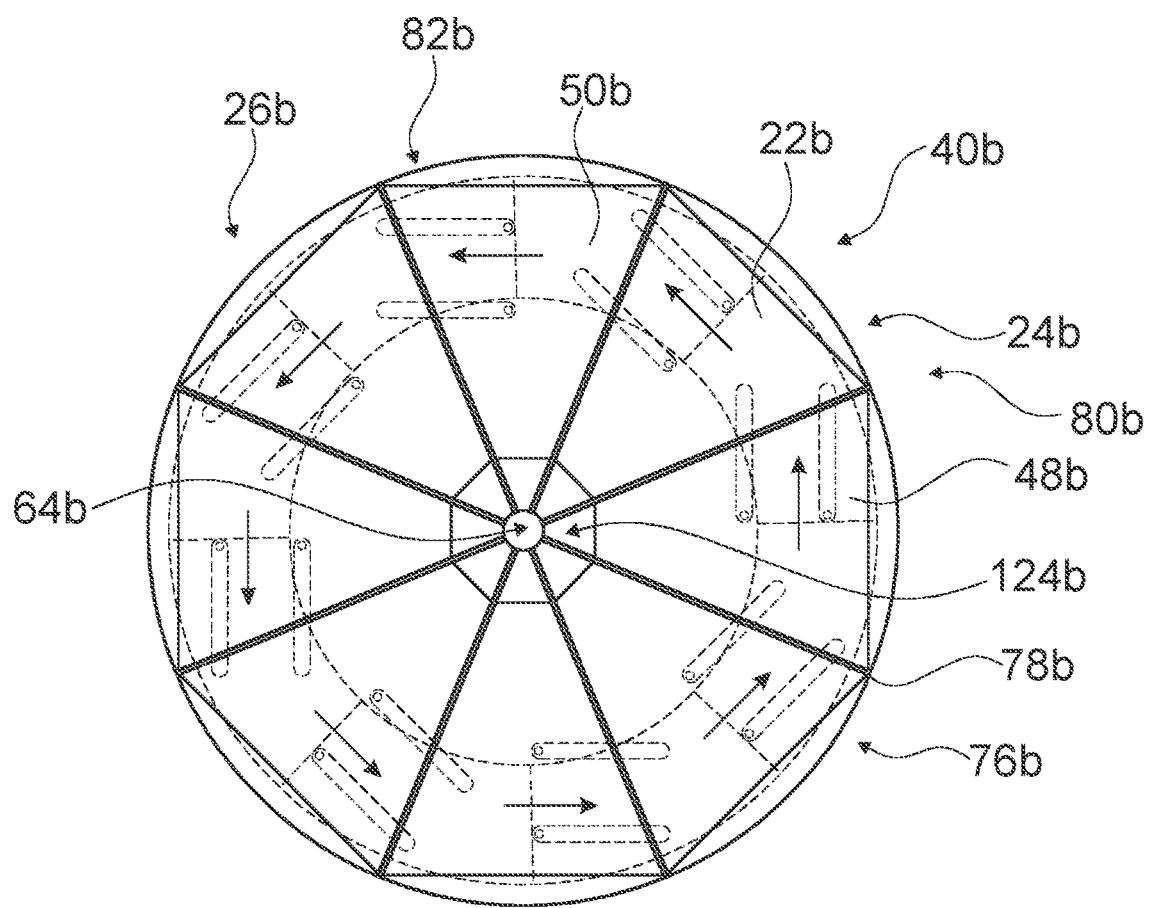
Figure 9:
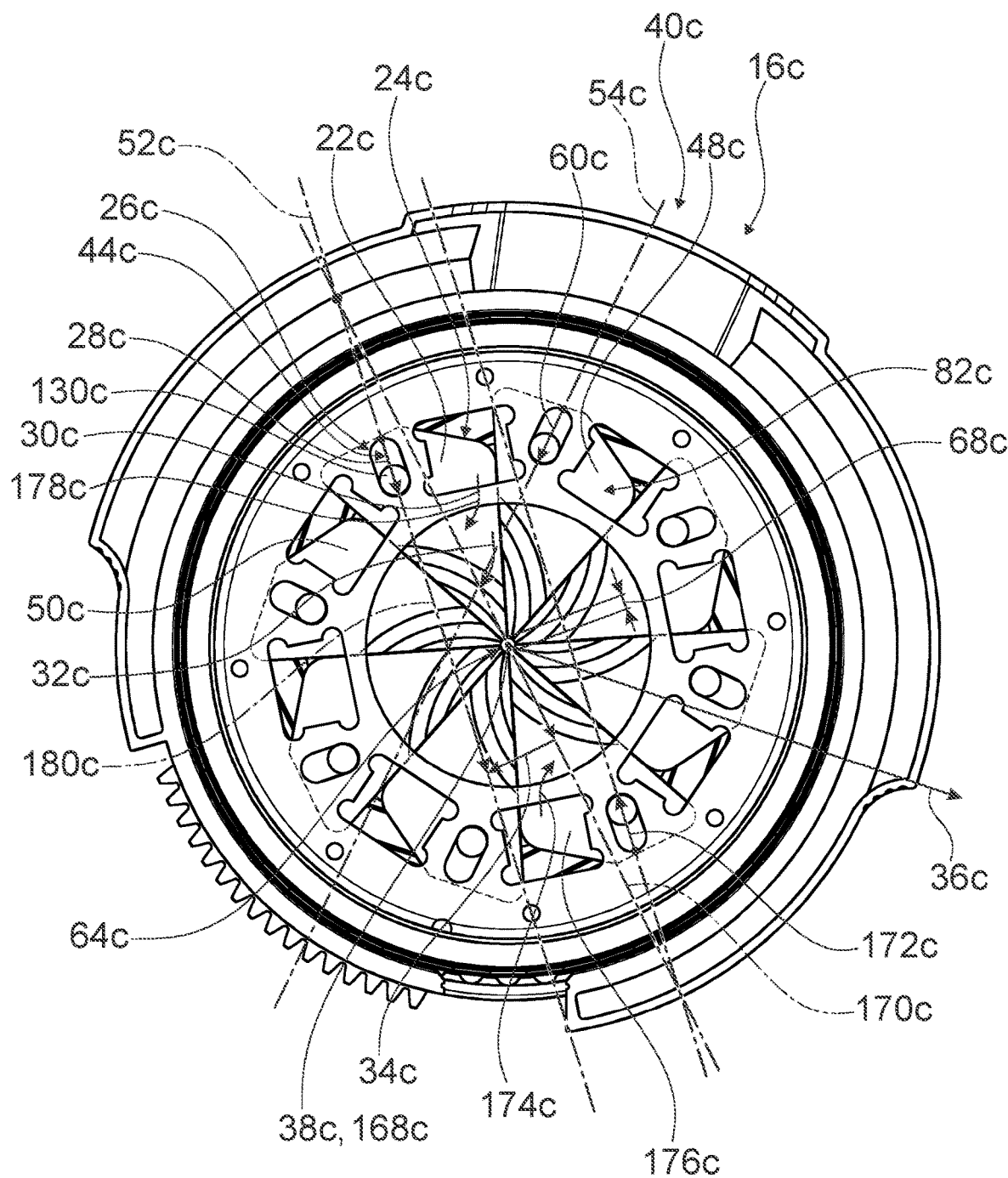
Figure 10:
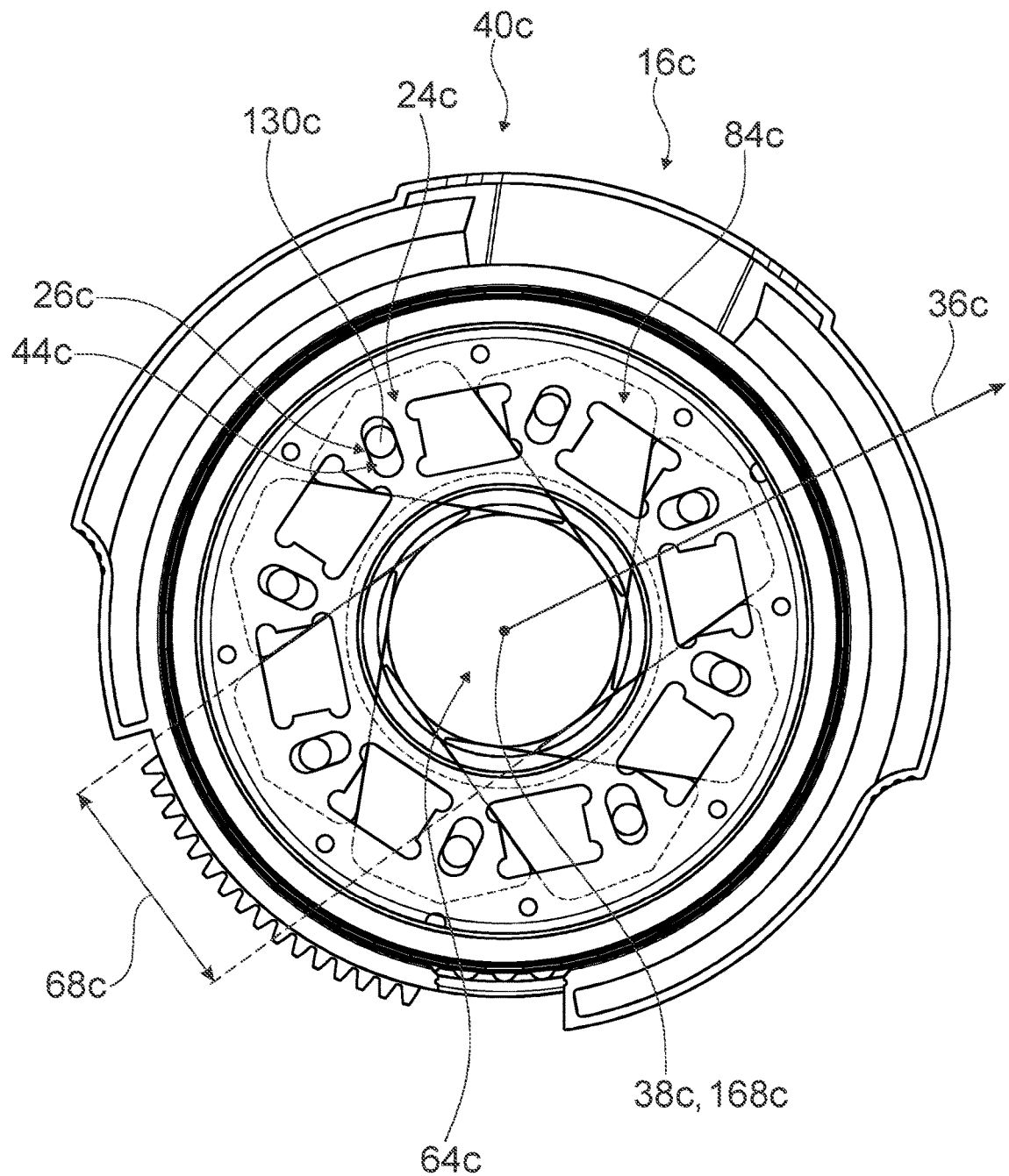
Figure 11:
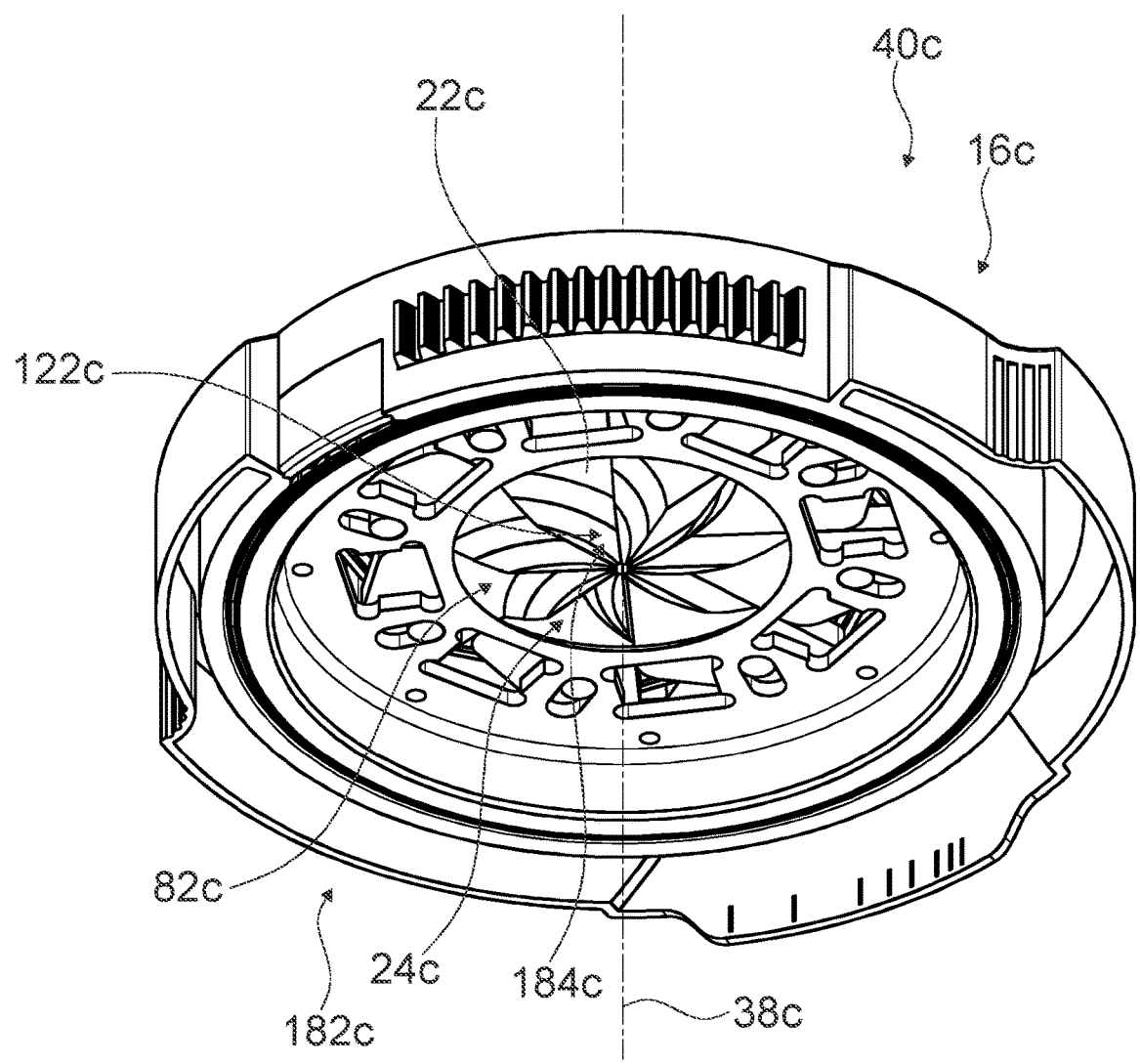
Figure 12A:
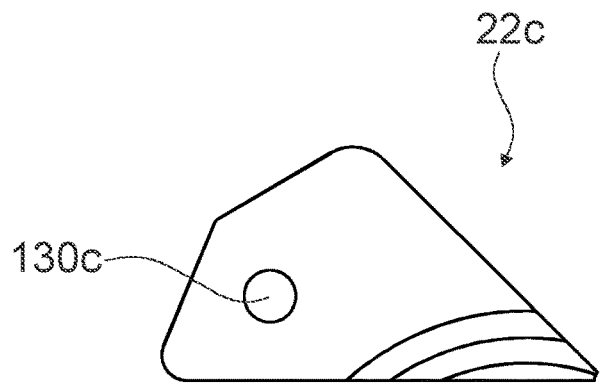
Figure 12B:
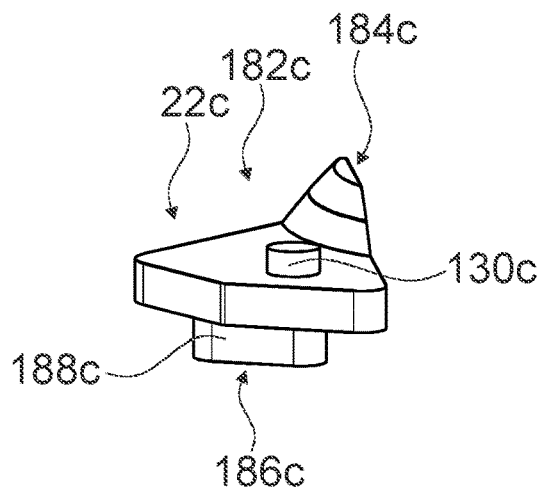
Figure 12C:
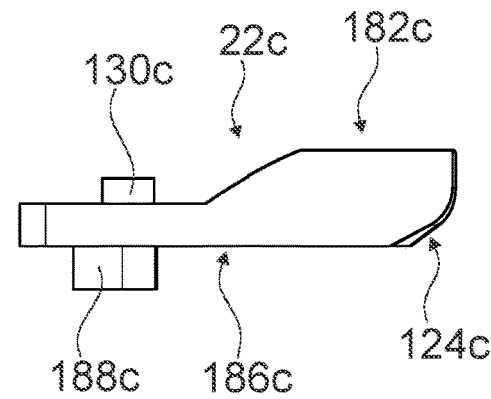
Figure 12D:
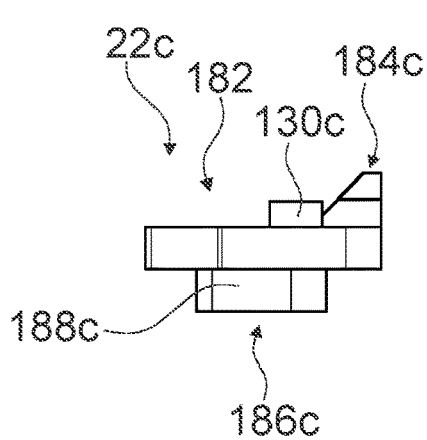
Figure 12E:
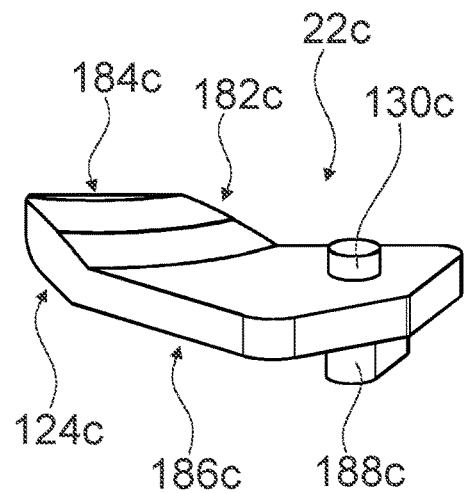

It is shown in:

FIG. 1 a schematic representation of a shrink-clamping and/or unshrink-unclamping station with an induction heating device and with a tool clamped in a tool holder, FIG. 2 a schematic representation of a magnetic flux conducting unit of the induction heating device in a first setting, FIG. 3 a schematic representation of the magnetic flux conducting unit of the induction heating device in a second setting, FIG. 4 a schematic representation of the magnetic flux conducting unit of the induction heating device in a third setting, FIG. 5 a schematic representation of the magnetic flux conducting unit in a fourth setting, FIG. 6 a schematic flow chart of a method for operating the induction heating device, FIG. 7 a schematic flow chart of a method for producing the induction heating device, FIG. 8 a schematic representation of an alternative magnetic flux conducting unit of an alternative induction heating device with alternative magnetic flux conducting elements, FIG. 9 a schematic representation of a further alternative induction heating device with a further alternative magnetic flux conducting unit in a first setting, FIG. 10 a schematic representation of the further alternative induction heating device with the further alternative magnetic flux conducting unit in a second setting, FIG. 11 a schematic perspective view from below of the further alternative magnetic flux conducting unit, and FIG. 12a-e different schematic perspective views of magnetic flux conducting elements of the alternative magnetic flux conducting unit.

DESCRIPTION OF THE EXEMPLARY EMBODIMENTS

FIG. 1 shows a shrink-clamping and/or unshrink-unclamping station 88a. The shrink-clamping and/or unshrink-unclamping station 88a is configured for tools 10a. The shrink-clamping and/or unshrink-unclamping station 88a is realized as a shrink-clamping station. The shrink-clamping and/or unshrink-unclamping station 88a may be part of a presetting and/or measuring apparatus for tools 10a and/or part of a multi-clamping and measuring and/or presetting station, for example like the one described in a German patent application having the application number 10 2019 115 607.6.

The shrink-clamping and/or unshrink-unclamping station 88a comprises a base frame 98a, in or on which the functional units of the shrink-clamping and/or unshrink-unclamping station 88a are mounted. The shrink-clamping and/or unshrink-unclamping station 88a comprises a holding device 100a for tool holders 12a. The holding device 100a comprises a length adjusting pin 102a for a presetting of an insertion depth for a tool 10a in the tool holder 12a. The length adjusting pin 102a is configured to be slid into the tool holder 12a from below, thus forming an abutment for a tool 10a that is introduced into the tool holder 12a in a shrink-clamping process. Alternatively or additionally, the length adjusting pin 102a could be configured, in an unshrink-unclamping process, to exert a pressure from below onto a tool 10*a* in the tool holder 12*a*, said pressure pushing the tool 10*a* out of the tool holder 12*a* as soon as the tool holder 12*a* has been sufficiently expanded thermally.

The tool holder 12*a* embodied as a shrink-clamp chuck is positioned in the holding device 100*a* shown in FIG. 1. An exemplary tool 10*a* is fixated in the tool holder 12*a* that is shown in FIG. 1 by way of example. The illustrated tool 10*a* is implemented as a shaft tool, in particular as a shaft drill. The illustrated tool 10*a* comprises a tool shaft 112*a*. Alternatively the tool 10*a* could also be implemented as a shaft tool differing from a shaft drill. The tool 10*a* is configured to be fixated, in particular thermally clamped, in the tool holder 12*a*. The tool holder 12*a* and the tool 10*a* clamped in the tool holder 12*a* form a mounted tool unit. The tool holder 12*a* has a designated rotation axis 20*a*. The designated rotation axis 20*a* of the tool holder 12*a* is implemented as an axis which the tool holder 12*a* is rotated around in an operation, for example in a machining operation. The rotation axis 20*a* of the tool holder 12*a* may form a rotation symmetry axis of the tool holder 12*a*. A tool receiving region of the tool holder 12*a*, in which the tool 10*a* is fixated in a shrink-clamping process, is oriented parallel to the rotation axis 20*a* of the tool holder 12*a*.

The shrink-clamping and/or unshrink-unclamping station 88*a* comprises an induction heating device 40*a*. The shrink-clamping and/or unshrink-unclamping station 88*a* comprises a tower 104*a*. The tower 104*a* comprises support rails 106*a*. The induction heating device 40*a* is linearly movable up and down along the support rails 106*a*. The induction heating device 40*a* is movable along the support rails 106*a* toward the holding device 100*a*. The shrink-clamping and/or unshrink-unclamping station 88*a* may comprise a gripper device (not shown). A gripper device is configured for gripping a tool 10*a* or a tool holder 12*a* and for moving it horizontally and vertically relative to the holding device 100*a*. A gripper device is configured for fully automatedly inserting a tool holder 12*a* into the holding device 100*a* and/or removing said tool holder 12*a* from the holding device 100*a*. A gripper device is configured for fully automatedly inserting a tool 10*a* into a tool holder 12*a*, in particular the shrink-clamp chuck, and/or removing said tool 10*a* from the tool holder 12*a*. The shrink-clamping and/or unshrink-unclamping station 88*a* may comprise a further tower, on which the gripper device is supported such that it is movable in a linearly vertical manner. The gripper device may moreover be supported on the further tower such that it is movable in a linearly horizontal manner. The shrink-clamping and/or unshrink-unclamping station 88*a* further comprises a cooling station (not shown) for a cooling of the heated-up tool holders 12*a*.

The shrink-clamping and/or unshrink-unclamping station 88*a* comprises a control and/or regulation unit 114*a*. The control and/or regulation unit 114*a* is configured for a controlling of an, in particular automated and/or motorized, movement of the induction heating device 40*a* relative to the tower 104*a*. The control and/or regulation unit 114*a* is configured for an, in particular automated and/or motorized, controlling of a gripper device. The control and/or regulation unit 114*a* is configured for a controlling of the, in particular automated and/or motorized, movement of a gripper device relative to a tower 104*a*. The control and/or regulation unit 114*a* is configured for an, in particular automated and/or motorized, controlling of a pressure force generated by the length adjusting pin 102*a* and/or of a position of the length adjusting pin 102*a*, in particular relative to the tool holder 12*a*. The control and/or regulation unit 114*a* is configured for a controlling of a current supply and/or voltage supply of the induction heating device 40*a*. The shrink-clamping and/or unshrink-unclamping station 88*a* comprises a motorically driven adjusting unit 96*a*. The motorically driven adjusting unit 96*a* is configured for an adjustment of internal structural components of the induction heating device 40*a*. The control and/or regulation unit 114*a* is configured for a controlling of the motorically driven adjusting unit 96*a*.

The induction heating device 40*a* is configured for an unshrink-unclamping of tools 10*a* out of a tool holder 12*a*. Alternatively or additionally the induction heating device 40*a* is configured for a shrink-clamping of tools 10*a* into a tool holder 12*a*. The induction heating device 40*a* comprises an induction heating unit 16*a*. The induction heating unit 16*a* comprises an induction coil 14*a*. The induction coil 14*a* is configured for a thermal expanding of the tool holder 12*a*. The induction coil 14*a* is configured to be put over the tool holder 12*a* and over the tool 10*a*. The induction heating unit 16*a* forms a receiving region 18*a*. The receiving region 18*a* of the induction heating unit 16*a* is implemented as a central, in particular vertically oriented, preferably at least substantially cylindrical or conical opening 116*a* in the induction heating unit 16*a*. The opening 116*a* of the receiving region 18*a* extends completely through the induction heating unit 16*a*. The receiving region 18*a* extends parallel to a coil axis 118*a* of the induction coil 14*a*. The receiving region 18*a* has an axial direction 38*a*. The axial direction 38*a* of the receiving region 18*a* extends parallel to the coil axis 118*a* of the induction coil 14*a*. The receiving region 18*a* is oriented parallel to the designated rotation axis 20*a* of the tool holder 12*a*, in particular if the tool holder 12*a* is inserted in the receiving region 18*a* and/or if the tool holder 12*a* is positioned in the holding device 100*a* of the shrink-clamping and/or unshrink-unclamping station 88*a*. The induction heating unit 16*a*, in particular an induction magnetic field of the induction coil 14*a*, is configured, in a shrink-clamping and/or unshrink-unclamping process, to thermally expand a portion of a tool holder 12*a* that is arranged in the receiving region 18*a* of the induction heating unit 16*a* by heating.

The induction heating device 40*a* comprises a magnetic flux conducting unit 24*a*. The magnetic flux conducting unit 24*a* is configured for a conduction of the magnetic flux generated by the induction coil 14*a*, in particular of the magnetic field lines of the induction magnetic field generated by the induction coil 14*a*. The magnetic flux conducting unit 24*a* is arranged in the axial direction 38*a* of the receiving region 18*a* above the induction coil 14*a* of the induction heating unit 16*a*. Alternatively or additionally the magnetic flux conducting unit 24*a* or a further magnetic flux conducting unit (not shown) may be arranged below the induction coil 14*a* of the induction heating unit 16*a*. The magnetic flux conducting unit 24*a* forms a shielding unit 80*a* for a shielding of the induction magnetic field of the induction coil 14*a* of the induction heating unit 16*a*. In FIG. 2 the magnetic flux conducting unit 24*a* is illustrated schematically. The magnetic flux conducting unit 24*a* comprises a magnetic flux conducting element 22*a*. The magnetic flux conducting unit 24*a* comprises further magnetic flux conducting elements 48*a*, 50*a*. The further magnetic flux conducting elements 48*a*, 50*a* are arranged neighboring on the magnetic flux conducting element 22*a* in the magnetic flux conducting unit 24*a*. In total the magnetic flux conducting unit 24*a* shown in FIG. 2 by way of example comprises eight magnetic flux conducting elements 22*a*, 48*a*, 50*a*. In this way advantageously an especially dense and/or effective shielding of the induction magnetic field of the induction coil 14a is achievable. However, numbers of magnetic flux conducting elements 22a, 48a, 50a differing from eight are also conceivable.

The magnetic flux conducting elements 22a, 48a, 50a are implemented of a ferrimagnetic oxide ceramic. The magnetic flux conducting elements 22a, 48a, 50a are implemented of a ferrite material. The magnetic flux conducting elements 22a, 48a, 50a form shielding elements of the shielding unit 80a. Each magnetic flux conducting element 22a, 48a, 50a of the magnetic flux conducting unit 24a forms respectively one individual shielding element. The magnetic flux conducting unit 24a has an inner opening 64a. The inner opening 64a of the magnetic flux conducting unit 24a is adjustable in size, in particular in diameter. The inner opening 64a of the magnetic flux conducting unit 24a is continuously adjustable in size, in particular in diameter. The magnetic flux conducting elements 22a, 48a, 50a are configured to form the inner opening 64a that is adjustable in size. The magnetic flux conducting elements 22a, 48a, 50a are configured to circumferentially encompass a tool 10a that is arranged at least partly in the receiving region 18a of the induction heating unit 16a or a tool holder 12a that is arranged at least partly in the receiving region 18a of the induction unit 16a in such a way that the encompassing, in particular independently from a dimension of the circumference of the encompassed tool 10a or of the encompassed tool holder 12a, is at least substantially free of gaps. In particular viewed at least in the axial direction 38a of the receiving region 18a, each magnetic flux conducting element 22a, 48a, 50a is arranged in the induction heating unit 16a free of overlap with any further magnetic flux conducting elements 22a, 48a, 50a of the magnetic flux conducting unit 24a. Neighboring magnetic flux conducting elements 22a, 48a, 50a of the magnetic flux conducting unit 24a are closely adjacent to one another in all possible adjustable arrangements. The magnetic flux conducting elements 22a, 48a, 50a are oriented planarly and/or flush with one another. The tool holder 12a comprises a runout 56a at its upper end. The runout 56a is arranged around a tool receiving opening of the tool holder 12a. In a shielding state, the magnetic flux conducting elements 22a, 48a, 50a lie planarly upon the runout 56a.

The magnetic flux conducting elements 22a, 48a, 50a are situated in a common plane, in particular in a common movement plane 42a. Each magnetic flux conducting element 22a, 48a, 50a comprises shielding surfaces 120a. The shielding surfaces 120a form upper sides or undersides of the magnetic flux conducting elements 22a, 48a, 50a. The shielding surfaces 120a of the magnetic flux conducting elements 22a, 48a, 50a extend perpendicularly to the axial direction 38a of the receiving region 18a. The shielding surfaces 120a of the magnetic flux conducting elements 22a, 48a, 50a extend parallel to a radial direction 36a of the receiving region 18a. The radial directions 36a of the receiving region 18a extend, starting from an axis that runs centrally through the receiving region 18a and parallel to the axial direction 38a, radially outward in a ray-like manner. The radial directions 36a of the receiving region 18a extend, starting from the coil axis 118a, radially outward. The radial directions 36a of the receiving region 18a extend perpendicularly to the axial direction 38a and/or perpendicularly to the coil axis 118a.

Each magnetic flux conducting element 22a, 48a, 50a has a shape of an acute-angled isosceles triangle in which a corner opposite a vertex 122a of the isosceles triangle is cut off straight. Alternatively, it is conceivable that at least one magnetic flux conducting element 22a, 48a, 50a or a plurality of magnetic flux conducting elements 22a, 48a, 50a has/have a shape differing from the shape of another magnetic flux conducting element 22a, 48a, 50a. An edge of at least one magnetic flux conducting element 22a, 48a, 50a of the magnetic flux conducting unit 24a, which faces towards the receiving region 18a, in particular the vertex 122a of a magnetic flux conducting element 22a, 48a, 50a or the vertices 122a of a plurality of magnetic flux conducting elements 22a, 48a, 50a, is/are broken by a chamfer 124a. This advantageously enables creating something like a funnel-shape of the magnetic flux conducting elements 22a, 48a, 50a, thus facilitating an especially advantageous magnetic flux conduction, in particular magnetic field conduction.

The induction heating device 40a comprises a bearing unit 26a. The bearing unit 26a is configured for a movable support of the magnetic flux conducting elements 22a, 48a, 50a. The bearing unit 26a predetermines a possible movement of the magnetic flux conducting elements 22a, 48a, 50a. The bearing unit 26a defines the degrees of freedom of movement of the magnetic flux conducting elements 22a, 48a, 50a. At least a large portion of all points of each magnetic flux conducting element 22a, 48a, 50a, preferably all points of each magnetic flux conducting element 22a, 48a, 50a, have a movement path 28a, 30a, 32a predetermined by the bearing unit 26a. If a point of a magnetic flux conducting element 22a, 48a, 50a, in case of a movement of at least one other point of the magnetic flux conducting element 22a, 48a, 50a, remains in one and the same place, this immobile point has no movement path, respectively does not realize a movement path. The magnetic flux conducting elements 22a, 48a, 50a are supported such that they are not pivotable. The bearing unit 26a prevents a pivoting of the magnetic flux conducting elements 22a, 48a, 50a around all potential pivot axes. Each of the movement paths 28a, 30a, 32a extends at least largely, preferentially completely, in the plane that is situated at least substantially perpendicularly to the axial direction 38a of the receiving region 18a. Each of the movement paths 28a, 30a, 32a extends at least largely, preferentially completely, in the movement plane 42a. Each of the movement paths 28a, 30a, 32a has an essential movement component 34a which is oriented perpendicularly to the radial direction 36a of the receiving region 18a and at the same time perpendicularly to the axial direction 38a of the receiving region 18a. Each of the movement paths 28a, 30a, 32a, in particular each movement path 28a, 30a, 32a of all those points of the magnetic flux conducting elements 22a, 48a, 50a which have a movement path 28a, 30a, 32a, has an essential movement component 34a, which is oriented perpendicularly to all radial directions 36a of the receiving region 18a which are situated in a common plane (radial plane), in particular perpendicularly to all conceivable radial directions 36a comprised in a bunch of all possible radial directions 36a starting from the axial direction 38a and situated in a common plane (radial plane), and which is at the same time oriented perpendicularly to the axial direction 38a of the receiving region 18a. The magnetic flux conducting elements 22a, 48a, 50a are configured to (continuously) change the size, in particular the diameter, of the inner opening 64a by movements along the movement paths 28a, 30a, 32a.

At least one of the movement paths 28a, 30a, 32a is a purely linear movement path. In the exemplary embodiment shown in FIGS. 2 to 5 all movement paths 28a, 30a, 32a are purely linear movement paths. The at least one purely linear movement path extends at least substantially perpendicularly to the radial direction 36a of the receiving region 18a of the induction heating unit 16a. In the exemplary embodiment shown in FIGS. 2 to 5 all movement paths extend at least substantially perpendicularly to the radial direction 36a of the receiving region 18a of the induction heating unit 16a. A straight prolongation 52a of one of the purely linear movement paths 28a, of the family of movement paths 28a, 30a, 32a of the magnetic flux conducting element 22a predetermined by the bearing unit 26a, includes an angle α with a straight prolongation 54a of a further purely linear movement path 60a of a further family of further movement paths 60a, 62a of the further magnetic flux conducting element 48a predetermined by the bearing unit 26a. The angle α complies with the formula α=360°/$N_M$, $N_M$ being equivalent to a total number of all magnetic flux conducting elements 22a, 48a, 50a of the magnetic flux conducting unit 24a. In the exemplarily shown case of FIGS. 2 to 5 $N_M$=8 and thus α=45°.

The bearing unit 26a comprises a slotted guide 44a, which is allocated to the magnetic flux conducting element 22a. The slotted guide 44a is configured to limit a freedom of movement at least of the magnetic flux conducting element 22a, 48a, 50a. Each magnetic flux conducting element 22a, 48a, 50a of the magnetic flux conducting unit 24a has an allocated slotted guide 44a, 126a, 128a. The slotted guides 44a, 126a, 128a are respectively embodied as guide rails. For a guiding of the magnetic flux conducting elements 22a, 48a, 50a, the magnetic flux conducting elements 22a, 48a, 50a, in particular monolithic extensions of the magnetic flux conducting elements 22a, 48a, 50a or pins 130a, 132a, 134a (or the like) attached to the magnetic flux conducting elements 22a, 48a, 50a, engage at least partly into the respectively allocated slotted guide 44a, 126a, 128a. The slotted guides 44a, 126a, 128a, in particular the guide rails of the slotted guides 44a, 126a, 128a, have a straight course.

The bearing unit 26a comprises a second slotted guide 46a, which is allocated to the magnetic flux conducting element 22a. The second slotted guide 46a is configured for a further limitation of the freedom of movement of the magnetic flux conducting element 22a. The second slotted guide 46a is configured to prevent a free rotation of the magnetic flux conducting element 22a. The second slotted guide 46a is oriented at least substantially parallel to the slotted guide 44a. Each magnetic flux conducting element 22a, 48a, 50a of the magnetic flux conducting unit 24a comprises an allocated second slotted guide 46a, 136a, 138a. Each of the second slotted guides 46a, 136a, 138a is oriented at least substantially parallel to the respective slotted guide 44a, 126a, 128a allocated to the same magnetic flux conducting element 22a, 48a, 50a. The second slotted guides 46a, 136a, 138a are respectively embodied as guide rails. For a guiding of the magnetic flux conducting elements 22a, 48a, 50a, the magnetic flux conducting elements 22a, 48a, 50a, in particular second monolithic extensions of the magnetic flux conducting elements 22a, 48a, 50a or further pins 140a, 142a, 144a (or the like) attached to the magnetic flux conducting elements 22a, 48a, 50a, engage at least partly into the respectively allocated second slotted guide 46a, 136a, 138a. The second slotted guides 46a, 136a, 138a, in particular the guide rails of the second slotted guides 46a, 136a, 138a, have a straight course.

The magnetic flux conducting elements 22a, 48a, 50a comprise respectively two end positions 82a, 84a, which are predetermined by the bearing unit 26a, in particular by the slotted guides 44a, 46a, 126a, 128a, 136a, 138a. The end positions 82a, 84a constitute extreme positions of the magnetic flux conducting elements 22a, 48a, 50a within the magnetic flux conducting unit 24a. In the illustration of FIG. 2, the magnetic flux conducting elements 22a, 48a, 50a are situated in the first end position 82a. The inner opening 64a of the magnetic flux conducting unit 24a has a minimum opening diameter 68a when the magnetic flux conducting elements 22a, 48a, 50a are in the first end position 82a. The minimum opening diameter 68a is approximately 4 mm in the exemplary illustration of FIG. 2. In the first end position 82a, the magnetic flux conducting elements 22a, 48a, 50a of the magnetic flux conducting unit 24a form in a synopsis a sawblade-like shape 74a. In the illustration of FIG. 5 the magnetic flux conducting elements 22a, 48a, 50a are in the second end position 84a. The inner opening 64a of the magnetic flux conducting unit 24a has a maximum opening diameter 68a when the magnetic flux conducting elements 22a, 48a, 50a are in the second end position 84a. In the exemplary illustration of FIG. 5, the maximum opening diameter 68a is approximately 45 mm. In the second end position 84a the magnetic flux conducting elements 22a, 48a, 50a of the magnetic flux conducting unit 24a form an isogon shape 76a. The isogon 76a formed by the magnetic flux conducting elements 22a, 48a, 50a has a number of corners 78a that corresponds to a number of magnetic flux conducting elements 22a, 48a, 50a of the magnetic flux conducting unit 24a. In the second end position 84a the magnetic flux conducting unit 24a has a maximum outer diameter 66a. The maximum outer diameter 66a of the magnetic flux conducting unit 24a corresponds to a diameter of a circle 148a within which all magnetic flux conducting elements 22a, 48a, 50a of the magnetic flux conducting unit 24a are contained in all arrangements which can be set by the bearing unit 26a. In the exemplary illustrations of FIGS. 2 to 5 the maximum outer diameter 66a is approximately 110 mm. A difference between the maximum outer diameter 66a and the maximum opening diameter 68a of the inner opening 64a is maximally 160% of the maximum opening diameter 68a. Each magnetic flux conducting element 22a, 48a, 50a has at least one longest side edge 72a. The longest side edge 72a has an edge length constituting the maximum edge length 70a of all edge lengths of the magnetic flux conducting elements 22a, 48a, 50a. A difference between the maximum outer diameter 66a and the maximum opening diameter of the inner opening 64a is maximally 160% of the maximum edge length 70a of the longest side edge 72a of one of the magnetic flux conducting elements 22a, 48a, 50a, in particular of all magnetic flux conducting elements 22a, 48a, 50a. The motoric adjusting unit 96a is configured, for the purpose of setting the opening diameter 68a of the inner opening 64a, to automatedly move the magnetic flux conducting elements 22a, 48a, 50a along the movement paths 28a, 30a, 32a predetermined by the bearing unit 26a. The magnetic flux conducting elements 22a, 48a, 50a each comprise a slide surface 58a at least on contact edges. The slide surface 58a is implemented as a slide coating.

Between the two end positions 82a, 84a of the movement paths 28a, 30a, 32a, the bearing unit 26a forms at least one latch position 86a, 146a for the magnetic flux conducting unit 24a, in particular for each magnetic flux conducting element 22a, 48a, 50a. In the latch positions 86a, 146a an autonomous release or slipping of one or several magnetic flux conducting element/s 22a, 48a, 50a is respectively prevented. The bearing unit 26a comprises latch elements (not shown), which latch with the magnetic flux conducting elements 22a, 48a, 50a and/or with the pins 130a, 132a, 134a, 140a, 142a, 144a of the magnetic flux conducting elements 22a, 48a, 50a for a securing of the positioning of the magnetic flux conducting elements 22a, 48a, 50a. The induction heating device 40a, in particular the motoric adjusting unit 96a, comprises a drive unit 156a. The drive unit 156a is configured for a manually driven and/or a motorically driven driving of the movement of the magnetic flux conducting elements 22a, 48a, 50a. The drive unit 156a comprises a manual drive element 158a. The manual drive element 158a forms a lever and/or a handle, by which an operator may create and/or execute the movement of the magnetic flux conducting elements 22a, 48a, 50a. The manual drive element 158a interacts with the (not shown) latch elements of the bearing unit 26a. In this way it is advantageously possible to realize an easy setting of given latch positions 82a, 84a, 86a, 146a of the bearing unit 26a, thus avoiding maloperation. Alternatively or additionally, the drive unit 156a comprises a motoric drive element 160a. The motoric drive element 160a is embodied as a motor, for example an electromotor or a hydraulically or pneumatically driven motor. The motoric drive element 160a is automatedly actuatable by the control and/or regulation unit 114a. The motoric drive element 160a is configured for an automated setting of the movement and/or of the position of the magnetic flux conducting elements 22a, 48a, 50a. The motoric drive element 160a is configured for a continuous adjustment of the position of the magnetic flux conducting elements 22a, 48a, 50a. The control and/or regulation unit 114a is configured to detect a contacting of the magnetic flux conducting elements 22a, 48a, 50a with a tool shaft 112a. The control and/or regulation unit 114a is configured for setting a force that is exerted onto the tool shaft 112a by the magnetic flux conducting elements 22a, 48a, 50a. The motoric drive element 160a is configured to control the magnetic flux conducting elements 22a, 48a, 50a such that the magnetic flux conducting unit 24a can realize a tool gripper function. In this case the magnetic flux conducting unit 24a implements a tool gripper unit 162a. The drive unit 156a comprises a rotatable drive disk 164a. The rotatable drive disk 164a is rotationally movable, in particular drivable, via the motoric drive element 160a and/or via the manual drive element 158a. The drive disk 164a comprises abutments 166a. The abutments 166a are configured to interact with pins 130a, 132a, 134a of the magnetic flux conducting elements 22a, 48a, 50a, thus moving, in particular pushing, the magnetic flux conducting elements 22a, 48a, 50a along the slotted guides 44a, 126a, 128a.

In FIG. 3 the magnetic flux conducting elements 22a, 48a, 50a are illustrated in an exemplary first latch position 86a. In the example of FIG. 3 the opening diameter 68a is approximately 10 mm. In the first latch position 86a the magnetic flux conducting elements 22a, 48a, 50a of the magnetic flux conducting unit 24a form in a synopsis a sawblade-like shape 74a. In FIG. 4 the magnetic flux conducting elements 22a, 48a, 50a are illustrated in an exemplary second latch position 146a. In the example of FIG. 4 the opening diameter 68a is approximately 25 mm. In the second latch position 146a the magnetic flux conducting elements 22a, 48a, 50a of the magnetic flux conducting unit 24a form in a synopsis a sawblade-like shape 74a.

FIG. 6 shows a flow chart of a method for operating the induction heating device 40a. In at least one method step 150a, a tool unit comprising a tool holder 12a and a tool 10a is inserted into the holding device 100a of the shrink-clamping and/or unshrink-unclamping station 88a. In at least one further method step 152a, the induction heating unit 16a, in particular the induction coil 14a, is put over the mounted tool unit. In the method step 152a the tool holder 12a is brought at least partly into the receiving region 18a of the induction heating unit 16a. In at least one further method step 90a, at least a portion of the tool holder 12a arranged in the receiving region 18a of the induction heating unit 16a is expanded by inductive heating in a shrink-clamping and/or unshrink-unclamping process. In the method step 90a an induction magnetic field is generated by the induction heating unit 16a. In at least one further method step 92a, a spreading of the induction magnetic field of the induction heating unit 16a is shielded by the magnetic flux conducting elements 22a, 48a, 50a of the magnetic flux conducting unit 24a above and/or below the induction heating unit 16a in the axial direction 38a of the receiving region 18a. In the method step 92a the magnetic flux conducting elements 22a, 48a, 50a are displaced in such a way that the opening diameter 68a of the inner opening 64a of the magnetic flux conducting unit 24a changes and preferably adapts to a diameter of the tool shaft 112a of the tool 10a. In the method step 92a, for setting the position of the magnetic flux conducting elements 22a, 48a, 50a relative to the tool holder 12a, all points of the magnetic flux conducting element 22a, 48a, 50a are moved along the movement paths 28a, 30a, 32a, each of which respectively comprising an essential movement component 34a that is oriented perpendicularly to the radial direction 36a of the receiving region 18a and at the same time perpendicularly to the axial direction 38a of the receiving region 18a.

FIG. 7 shows a flow chart of a method for producing the induction heating device 40a. In at least one method step 94a the magnetic flux conducting elements 22a, 48a, 50a are produced at least partly by an additive manufacturing procedure. In the method step 94a the magnetic flux conducting elements 22a, 48a, 50a are produced by a 3D printing procedure. In at least one further method step 154a, the magnetic flux conducting elements 22a, 48a, 50a are built into the induction heating unit 16a.

In FIG. 8 a further exemplary embodiment of the invention is illustrated. The following description and the drawings are essentially limited to the differences between the exemplary embodiments, wherein regarding identically denominated structural components, in particular regarding structural components having the same reference numerals, the drawings and/or the description of the other exemplary embodiments, in particular of FIGS. 1 to 7, may principally be referred to. To distinguish between the exemplary embodiments, the letter a has been added to the reference numerals of the exemplary embodiments of FIGS. 1 to 7. In the exemplary embodiment of FIG. 8 the letter a has been substituted by the letter b.

FIG. 8 shows an alternative induction heating device 40b with an alternative magnetic flux conducting unit 24b. The magnetic flux conducting unit 24b comprises alternative magnetic flux conducting elements 22b, 48b, 50b. The magnetic flux conducting elements 22b, 48b, 50b have a shape of an acute-angled isosceles triangle. Alternatively, the magnetic flux conducting elements 22b, 48b, 50b could also have other triangle shapes, for example asymmetrical triangle shapes.

FIG. 9 schematically shows a view from below of a further alternative induction heating device 40c with a further alternative magnetic flux conducting unit 24c. The magnetic flux conducting unit 24c comprises magnetic flux conducting elements 22c, 48, 50c, 176c. In the illustration of FIG. 9, the magnetic flux conducting elements 22c, 48, 50c, 176c are situated in a first end position 82c, in which an inner opening 64c of the magnet flux conducting unit 24c has a minimum opening diameter 68c. The magnetic flux conducting elements 22c, 48, 50c, 176c illustrated in FIG. 9 are, except for an implementation (in particular number and arrangement) of pins 130c of the magnetic flux conducting elements 22c, 48, 50c, 176c, implemented at least substantially identically to the magnetic flux conducting elements 22a, 48a, 50a illustrated in FIGS. 2 to 5. The induction heating device 40c comprises a bearing unit 26c for a movable support of the magnetic flux conducting elements 22c, 48, 50c. The bearing unit 26c comprises, for each of the magnetic flux conducting elements 22c, 48, 50c of the magnetic flux conducting unit 24c, precisely one slotted guide 44c, which is embodied as a straight guide rail. For a guiding of the magnetic flux conducting elements 22c, 48, 50c, the pins 130c of the magnetic flux conducting elements 22c, 48, 50c engage at least partly into the guide rails. The magnetic flux conducting elements 22c, 48, 50c shown in FIG. 9 are pivotable, in particular in a plane situated perpendicularly to an axial direction 38c of a receiving region 18c of an induction heating unit 16c of the induction heating device 40c, which comprises the magnetic flux conducting unit 24c, around an axis which in particular runs through the pin 130c. The guide rails are arranged angled to a radial direction 36c of the receiving region 18c. In the plane stretching perpendicularly to the axial direction 38c of the receiving region 18c, the guide rails are arranged angled to a direction that is perpendicular to the radial direction 36c of the receiving region 18c.

At least a large portion of all points of each magnetic flux conducting element 22c, 48c, 50c, 176c, preferably all points of each magnetic flux conducting element 22c, 48c, 50c, 176c, have a movement path 28c, 30c, 32c, 172c, 174c, which is predetermined by the bearing unit 26c. Each of the movement paths 28c, 30c, 32c, 172c, 174c, in particular each movement path 28c, 30c, 32c, 172c, 174c of all those points of the magnetic flux conducting elements 22c, 48c, 50c, 176c having a movement path 28c, 30c, 32c, 172c, 174c, has an essential movement component 34c oriented perpendicularly to the radial direction 36c of the receiving region 18c, in particular perpendicularly to all conceivable radial directions 36c of the receiving region 18c situated in a common plane (radial plane), and is oriented at the same time perpendicularly to the axial direction 38c of the receiving region 18c. In the case shown in FIG. 9, the movement component 34c corresponds to approximately 15% of a total movement 180c, in particular of a total movement direction and/or of a total movement component, preferably in an orthogonal vector decomposition of the total movement 180c as is exemplarily shown in FIG. 9. At least one of the movement paths 28c, 30c, 32c, 172c, 174c is a purely linear movement path 28c, 172c, 174c. In the exemplary embodiment shown in FIGS. 9 to 11 only the movement paths 28c, 172c, 174c of a point of the respective magnetic flux conducting elements 22c, 48c, 50c, 176c, which is situated below a center of the respective pin 130c, are purely linear movement paths. The points of the respective magnetic flux conducting elements 22c, 48c, 50c, 176c which describe purely linear movement paths moreover constitute those points of the respective magnetic flux conducting elements 22c, 48c, 50c, 176c around which the respective magnetic flux conducting elements 22c, 48c, 50c, 176c pivot during an adjustment movement of the magnetic flux conducting elements 22c, 48c, 50c, 176c. The magnetic flux conducting elements 22c, 48c, 50c, 176c have a movably supported pivot point. The magnetic flux conducting elements 22c, 48c, 50c, 176c execute a combination of a translational and a pivoting movement. With the exception of the points of the respective magnetic flux conducting elements 22c, 48c, 50c, 176c which describe purely linear movement paths, all further points of the respective magnetic flux conducting elements 22c, 48c, 50c, 176c execute an (unidirectional) pivot movement during the adjustment movement. A large portion of all further movement paths 30c, 32c, in particular all further movement paths 30c, 32c, are curved. A large portion of all further movement paths 30c, 32c, in particular all further movement paths 30c, 32c, have a curvature 178c. The curvature 178c of the curved movement paths 30c, 32c increases during a movement of the allocated magnetic flux conducting element 22c towards a center 168c of the induction heating unit 16c. The center 168c of the induction heating unit 16c in particular corresponds to a center of the inner opening 64c of the magnetic flux conducting unit 24c. The increase of the curvature 178c of the curved movement paths 30c, 32c is herein the greater, the closer the allocated magnetic flux conducting element 22c is to the center 168c of the induction heating unit 16c.

A straight prolongation 52c of the purely linear movement path 28c, of the family of movement paths 28c, 30c, 32c which are predetermined by the bearing unit 26c, runs parallel to a straight prolongation 170c of an additional further purely linear movement path 172c, of the further family of further movement paths 172c, 174c predetermined by the bearing unit 26c, of the additional further magnetic flux conducting element 176c of the magnetic flux conducting unit 24c. The straight prolongation 52c of the purely linear movement path 28c of the magnetic flux conducting element 22c and the straight prolongation 170c of the additional further purely linear movement path 172c, of the further family of further movement paths 172c, 174c predetermined by the bearing unit 26c, of the additional further magnetic flux conducting element 176c run on opposite-situated sides of the axial direction 38c and/or of the center 168c of the magnetic flux conducting unit 24c.

In the representation given in FIG. 10, the magnetic flux conducting elements 22c, 48c, 50c, 176c are in a second end position 84c, in which the inner opening 64c of the magnetic flux conducting unit 24c has a maximum opening diameter 68c. It is clearly apparent from the situation of the magnetic flux conducting elements 22c, 48c, 50c, 176c in the second end position 84c that, in a movement between the first end position 82c and the second end position 84c, the magnetic flux conducting elements 22c, 48c, 50c, 176c are at least partly pivoted.

The perspective view of the magnetic flux conducting unit 24c given in FIG. 11 shows that he magnetic flux conducting elements 22c, 48c, 50c, 176c have a bulge 184c on an underside 182c. The bulge 184c is respectively arranged at an end region of the magnetic flux conducting elements 22c, 48c, 50c, 176c that faces toward the center 168c and/or toward the axial direction 38c, in particular at a vertex 122c of the magnetic flux conducting elements 22c, 48c, 50c, 176c. The bulge 184c is respectively arranged on a side of the respective magnetic flux conducting element 22c, 48c, 50c, 176c which is situated in the axial direction 38c opposite a bevel 124c of the respective magnetic flux conducting element 22c, 48c, 50c, 176c. In the first end position 82c the bulges 184c form in a synopsis a sawblade-like shape. The bulges 184c advantageously enable an optimization of a support situation of the magnetic flux conducting elements 22c, 48c, 50c, 176c on a tool holder 12c. By the bulges 184c it is advantageously possible to optimize a conduction of the induction magnetic field from the magnetic flux conducting unit 24c to the tool holder 12c or vice versa. Alternative shapes and implementations of the bulge 184c as well as dispensing with the bulge 184c and/or with the bevel 124c are of course conceivable.

FIGS. 12a, 12b, 12c, 12d and 12e schematically show different views of a magnetic flux conducting element 22c of the magnetic flux conducting unit 24c. In particular in FIGS. 12b and 12e, the bulge 184c on the underside 182c of the magnetic flux conducting element 22c is clearly visible. In particular in FIGS. 12c and 12e, the bevel 124c on an upper side 186c of the magnetic flux conducting element 22c is clearly visible. On its upper side 186c, the magnetic flux conducting element 22c moreover comprises a drive element 188c, which is configured to transfer a force and/or movement, generated (for example via something like a drive disk 164c) in an adjustment of the magnetic flux conducting unit 24c, onto the respective magnetic flux conducting element 22c. Preferentially the drive element 188c forms an abutment 166c, via which the magnetic flux conducting element 22c can be displaced during the adjustment of the magnetic flux conducting unit 24c.

REFERENCE NUMERALS 10 tool
12 tool holder
14 induction coil
16 induction heating unit
18 receiving region
20 rotation axis
22 magnetic flux conducting element
24 magnetic flux conducting unit
26 bearing unit
28 movement path
30 movement path
32 movement path
34 movement component
36 radial direction
38 axial direction
40 induction heating device
42 movement plane
44 slotted guide
46 slotted guide
48 magnetic flux conducting element
50 magnetic flux conducting element
52 prolongation
54 prolongation
56 runout
58 slide surface
60 movement path
62 movement path
64 opening
66 outer diameter
68 opening diameter
70 edge length
72 longest side edge
74 sawblade-like shape
76 isogon
78 corner
80 shielding unit
82 end position
84 end position
86 latch position
88 shrink-clamping and/or unshrink-unclamping station
90 method step
92 method step
94 method step
96 adjusting unit
98 base frame
100 holding device
102 length-adjusting pin
104 tower
106 support rail
112 tool shaft
114 control and/or regulation unit
116 opening
118 coil axis
120 shielding surface
122 tip
124 bevel
126 slotted guide
128 slotted guide
130 pin
132 pin
134 pin
136 slotted guide
138 slotted guide
140 pin
142 pin
144 pin
146 latch position
148 circle
150 method step
152 method step
154 method step
156 drive unit
158 manual drive element
160 motoric drive element
162 tool gripper unit
164 drive disk
166 abutment
168 center
170 prolongation
172 movement path
174 movement path
176 magnetic flux conducting element
178 curvature
180 total movement
182 underside
184 bulge
186 upper side
188 drive element

The invention claimed is:

1. An induction heating device for a shrink-clamping and/or unshrink-unclamping of tools into and/or out of a tool holder, the induction heating device comprising:
an induction heating unit which comprises at least one induction coil and is configured, in a shrink-clamping and/or unshrink-unclamping process, to heat-expand at least a portion of the tool holder that is arranged in a receiving region of the induction heating unit,
at least one magnetic flux conducting unit arranged in an axial direction of the receiving region above the induction coil of the induction heating unit and comprising at least one magnetic flux conducting element for a conduction of a magnetic flux generated by the at least one induction coil, with the magnetic flux conducting unit realizing a shielding unit for a shielding of an induction magnetic field of the induction heating unit in the axial direction of the receiving region of the induction heating unit, and
a bearing unit which is configured at least for a movable support at least of the at least one magnetic flux conducting element,
wherein at least 51% of all points of the at least one magnetic flux conducting element, each have a respective movement path that is predetermined by the bearing unit, wherein each of the movement paths has an essential movement component that is oriented perpendicularly to a radial direction of the receiving region and at the same time perpendicularly to an axial direction of the receiving region, wherein the magnetic flux conducting unit comprises at least one further magnetic flux conducting element which is arranged neighboring to the at least one magnetic flux conducting element, and wherein the at least one magnetic flux conducting element is free of overlap with any of the at least one further magnetic flux conducting element of the magnetic flux conducting unit.

2. The induction heating device according to claim 1, wherein the at least one purely linear movement path runs at least substantially perpendicularly to the radial direction of the receiving region of the induction heating unit.

3. The induction heating device according to claim 1, wherein each of the movement paths extends in a movement plane that is situated at least substantially perpendicularly to the axial direction of the receiving region.

4. The induction heating device) according to claim 1, wherein the at least one magnetic flux conducting element is supported in a non-pivotable manner.

5. Induction heating device according to claim 1, wherein, except for the at least one purely linear movement path, at least 51% of all further movement paths are curved.

6. Induction heating device according to claim 5, wherein a curvature of the curved movement paths increases during a movement of an allocated magnetic flux conducting element toward a center of the induction heating unit.

7. The induction heating device according to claim 1, wherein the bearing unit comprises the at least substantially straight slotted guide for a limitation of a freedom of movement at least of the at least one magnetic flux conducting element.

8. The induction heating device according to claim 1, wherein neighboring magnetic flux conducting elements of the at least one magnetic flux conducting unit are adjacent to one another in all positions that can be set by the bearing unit, and wherein a gap between directly neighboring magnetic flux conducting elements is smaller than 0.5 mm.

9. The induction heating device according to claim 1, wherein a straight prolongation of a purely linear movement path, of a family of movement paths of the at least one magnetic flux conducting element which are predetermined by the bearing unit, runs parallel to a straight prolongation of an additional further purely linear movement path, of a further family of further movement paths which are predetermined by the bearing unit, of an additional further magnetic flux conducting element of the at least one magnetic flux conducting unit, and wherein these two straight prolongations are arranged on opposite-situated sides of the axial direction and/or of a center of the magnetic flux conducting unit.

10. The induction heating device according to claim 1, wherein magnetic flux conducting elements of the at least one magnetic flux conducting unit are configured to circumferentially encompass a tool arranged in the induction heating unit or the tool holder arranged in the induction heating unit in such a way that independently from a dimension of the circumference of the tool or the tool holder the encompassing is at least substantially gap-free.

11. The induction heating device according to claim 1, wherein a difference between a maximum outer diameter, within which all magnetic flux conducting elements of the at least one magnetic flux-conducting unit are arranged in all positions which can be set by the bearing unit, and a maximum opening diameter of the inner opening amounts to maximally 160% of the maximum opening diameter and/or of a maximum edge length of a longest side edge of one of the all magnetic flux conducting elements.

12. The induction heating device according to claim 1, wherein magnetic flux conducting elements of the at least one magnetic flux conducting unit form in a synopsis a sawblade-like shape or an isogon shape.

13. The induction heating device according to claim 1, wherein the at least one magnetic flux conducting element has a shape of an isosceles triangle or a shape of an isosceles triangle in which a corner opposite the vertex of the isosceles triangle has been cut off in a straight or rounded manner.

14. The induction heating device according to claim 1, wherein the bearing unit realizes, between end positions of the movement paths, at least one latch position for the at least one magnetic flux conducting unit.

15. A shrink-clamping and/or unshrink-unclamping station for tools or a presetting and/or measuring apparatus for tools comprising the induction heating device according to claim 1.

16. The shrink-clamping and/or unshrink-unclamping station according to claim 15, further comprising a motorically driven adjusting unit, which is configured, for the purpose of setting an opening diameter of an inner opening of the at least one magnetic flux conducting unit, to move at least the at least one magnetic flux conducting element, in an at least semi-automated manner, along the movement paths predetermined by the bearing unit.

17. A method for operating an induction heating device according to claim 1, in which in at least one method step at least a portion of the tool holder that is arranged in the receiving region of the induction heating unit is expanded by inductive heating in the shrink-clamping and/or unshrink-unclamping process, wherein in at least one further method step a spreading of an induction magnetic field of the induction heating unit in the axial direction of the receiving region above and/or below the induction heating unit is shielded by the at least one magnetic flux conducting element and the at least one further magnetic flux conducting element of the magnetic flux conducting unit, and wherein for an adjustment of the at least one magnetic flux conducting element and the at least one further magnetic flux conducting element relative to the tool holder, all points of the at least one magnetic flux conducting element and the at least one further magnetic flux conducting element are moved along the movement paths, each of which has the essential movement component that is oriented perpendicularly to the radial direction of the receiving region and at the same time perpendicularly to the axial direction of the receiving region.

18. A method for producing an induction heating device according to claim 1, wherein at least the at least one magnetic flux conducting element is manufactured in at least one method step at least partly by an additive manufacturing procedure.

19. The induction heating device according to claim 1, wherein at least one of the movement paths is a purely linear movement path.

\* \* \* \* \*